United States Patent
Eguchi et al.

(10) Patent No.: US 8,727,417 B2
(45) Date of Patent: May 20, 2014

(54) MOLDED LAYING INTERIOR MATERIAL FOR VEHICLE

(75) Inventors: Hiroyuki Eguchi, Aichi (JP); Toshiyuki Nakamura, Aichi (JP); Masanobu Matsuyama, Aichi (JP)

(73) Assignee: Hayashi Engineering Inc., Nagoya-shi, Aichi (JP)

( * ) Notice: Subject to any disclaimer, the term of this patent is extended or adjusted under 35 U.S.C. 154(b) by 0 days.

(21) Appl. No.: 13/004,895

(22) Filed: Jan. 12, 2011

(65) Prior Publication Data
US 2011/0206891 A1    Aug. 25, 2011

(30) Foreign Application Priority Data
Feb. 23, 2010   (JP) ................. 2010-037091

(51) Int. Cl.
*B60R 13/00*  (2006.01)
*B60R 13/08*  (2006.01)
*B60N 3/04*   (2006.01)
*B60R 13/01*  (2006.01)

(52) U.S. Cl.
CPC ........... *B60N 3/042* (2013.01); *B60N 3/048* (2013.01); *B60R 13/01* (2013.01); *B60R 13/0815* (2013.01)
USPC ................... 296/39.1; 296/97.23; 428/95

(58) Field of Classification Search
USPC .......... 296/39.1, 97.23; 428/86, 95, 131, 137, 428/138; 15/215, 216, 217, 238
See application file for complete search history.

(56) References Cited

U.S. PATENT DOCUMENTS

| 3,673,034 | A | 6/1972 | Squier |
| 2004/0180177 | A1* | 9/2004 | Ray et al. ................ 428/86 |
| 2004/0209038 | A1* | 10/2004 | Foxon ..................... 428/86 |
| 2007/0202302 | A1* | 8/2007 | Matsuura et al. ........ 428/174 |

FOREIGN PATENT DOCUMENTS

| EP | 0776761 A | 4/1997 |
| JP | H05-272041 A | 10/1993 |
| JP | H06-227305 A | 8/1994 |
| JP | H08-132990 A | 5/1996 |
| JP | H11-301328 A | 11/1999 |
| JP | 2002-193014 A | 7/2002 |
| JP | 2005-297703 A | 10/2005 |
| JP | 2008-068799 A | 3/2008 |

OTHER PUBLICATIONS

The extended European search report, dated Apr. 18, 2013.

\* cited by examiner

*Primary Examiner* — Glenn Dayoan
*Assistant Examiner* — Jason S Daniels
(74) *Attorney, Agent, or Firm* — Yokoi & Co., U.S.A., Inc.; Toshiyuki Yokoi

(57) ABSTRACT

The present invention discloses a molded laying interior material for a vehicle includes a decorative layer that faces a vehicle compartment and a buffer material layer that faces a vehicle body panel. The decorative layer has a first concavo-convex shape formed by press molding on a side of the vehicle compartment. The buffer material layer has a second concavo-convex shape formed by press molding a buffer material on a side of the vehicle body panel. The buffer material has a fiber structure in which fibers are oriented in a thickness direction in the fiber structure The decorative layer and the buffer material layer are at least laminated and integrated.

6 Claims, 19 Drawing Sheets

COMPARATIVE EXAMPLE

MOLDED LAYING INTERIOR MATERIAL FOR VEHICLE

CROSS-REFERENCES TO RELATED APPLICATIONS

The present application is related to the Japanese Utility Model Application No. 2010-037091, filed Feb. 23, 2010, the entire disclosure of which is expressly incorporated by reference herein.

BACKGROUND OF THE INVENTION

1. Field of the Invention

The present invention relates to a molded laying interior material for a vehicle having a decorative layer facing a vehicle compartment and a buffer material layer facing a vehicle body panel.

2. Description of Related Art

Interior materials of various kinds can be laid on an automobile body panel to improve decorative properties and add a touch of class. For example, floor carpets are laid as interior materials on the upper side of the vehicle body panel from a substantially flat floor panel to a toe board that rises upward.

Further, one type of felt can be provided on the rear surface of the floor carpet to improve cushioning ability thereof.

FIG. 18 is an exemplary illustration of an end surface obtained when a floor carpet 910 according to a comparative example is cut along a vertical plane extending in a front-rear direction of an automobile. The floor carpet 910 is formed by post-applying flat felt 913 to a rear surface 912 of a press-molded carpet body 911. The felt 913 is formed by defibrating original material fibers with a defibrator, supplying to a feeder, blending, forming fiber fleece through a carding machine, obtaining a multilayer structure by stacking the fiber fleece layers, interlacing the fibers by kneading or the like, press molding to a required thickness, and cutting to a desired size. In the felt 913 thus formed, constituting fibers 914 are oriented substantially parallel to the felt surface, that is, substantially parallel to the rear surface 912 of the carpet body.

FIG. 19 is an exemplary illustration of a method for manufacturing a floor carpet 920 for a vehicle described in Japanese Patent Application Laid-open No. H6-227305. This manufacturing method uses a thin underlay 931 having rigidity and formed along the shape of a lower mold 932 of a press molding die. The floor carpet 920 is formed by placing a premolded felt layer 925 on the underlay 931, placing the underlay 931 and the felt layer 925 in this state on the lower mold 932, laminating a carpet layer 923 on the felt layer 925, press molding the carpet layer 923 integrally with the felt layer 925 by mating an upper mold 933 with the lower mold 932, and separating the molded floor carpet 920 together with the underlay 931 from the lower mold 932. Felt in which the constituent fibers are oriented parallel to the felt surface is used for the felt layer 925.

The constituent fibers of the felt provided in the aforementioned floor carpet are oriented in the direction perpendicular to the thickness direction, that is, in the direction along the rear surface of the carpet body. Therefore, when an attempt is made to press mold the floor carpet into a deep concavo-convex shape along the upper surface of a vehicle body panel in the thickness direction of the unmolded felt, the felt layer thickness cannot change locally and the felt cannot be deeply drawn to follow the contour of the vehicle body panel. As a result, the floor carpet rises in the curved portions and the vehicle's interior appearance deteriorates.

With the manufacturing method described in Japanese Patent Application Laid-open No. H6-227305, the felt itself is press molded, to a certain degree, into a shape following the upper surface of the vehicle body panel, but the felt layer thickness still cannot be changed locally. It goes without saying that the felt cannot be molded by deep drawing so as to following the shape of the vehicle body panel even when the unmolded felt is placed on an underlay having protrusions and recesses and press molded together with the carpet body.

BRIEF SUMMARY OF THE INVENTION

The present invention discloses a novel molded laying interior material for a vehicle accommodated to a deep concavo-convex shape formed in a vehicle body panel.

One aspect of the present invention provides a molded laying interior material for a vehicle, comprising:

a decorative layer that faces a vehicle compartment; and
a buffer material layer that faces a vehicle body panel;
the decorative layer has a first concavo-convex shape formed by press molding on a side of the vehicle compartment;
the buffer material layer has a second concavo-convex shape formed by press molding a buffer material on a side of the vehicle body panel;
the buffer material has a fiber structure in which fibers are oriented in a thickness direction in the fiber structure; and
the decorative layer and the buffer material layer are at least laminated and integrated.

Since a fiber structure in which fibers are oriented in a thickness direction is used for the buffer material to be press molded, even though the buffer material is press molded, the buffer material layer accommodates to deep molding in the thickness direction.

The molded laying interior materials for a vehicle to which the present invention can be applied include a floor carpet having a felt layer, a dash silencer having a felt layer, and a side wall trim having a felt layer.

The decorative layer can be a carpet layer, a nonwoven fabric layer, a woven layer, a knitted layer, and a leather layer.

When the fibers of the fiber structure are assumed to be oriented in the thickness direction, it means that the orientation directions of the fibers match relatively well with a direction perpendicular to the front surface and rear surface of the buffer material. This definition includes the presence of folded-back portions for orienting the fibers in the thickness direction. Since the fibers constituting the fiber structure can have a curved shape, the fibers of the fiber structure being oriented in the thickness direction does not mean that straight fibers are arranged parallel to each other in the thickness direction of the fiber structure.

As follows from above, the fiber structure in which fibers are oriented in the thickness direction includes a fiber structure of a wavelike shape in which webs are repeatedly folded back in the thickness direction and a fiber structure in which folded-back portions of the fiber structure of the wavelike shape are cut out.

The fibers constituting the fiber structure may be of one kind or of two or more kinds, such as a combination of main fibers and adhesive fibers.

The decorative layer and buffer material layer may be formed by simultaneous press molding, or may be press molded separately and then integrated by adhesive bonding or the like, or only the buffer material layer may be molded and then the buffer material layer and the decorative layer may be formed by press molding them together, or only the decorative layer may be press molded and then the decorative layer and the buffer material layer may be formed by press molding them together.

The buffer material layer may be provided only on part of the surface of the molded laying interior material for a vehicle on the side of the vehicle body panel, and such a molded laying interior material for a vehicle is also included in the present invention.

Another layer such as a perforated resin layer or a sound absorbing layer may be provided between the decorative layer and the buffer material layer in the molded laying interior material for a vehicle, and such a molded laying interior material for a vehicle is also included in the present invention.

Further, a molded laying interior material for a vehicle in which a separate member such as felt is post-applied after the decorative layer and the buffer material layer have already been formed is also included in the present invention.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

An embodiment of the present invention will be described below. It goes without saying that the below-described embodiment merely exemplifies the present invention.

(1) Configuration of Molded Laying Interior Material for Vehicle

FIGS. 1 to 16 illustrate an example in which the molded laying interior material for a vehicle in accordance with the present invention is used in a floor carpet of an automobile. In the figures, FRONT represents the front side and REAR represents the rear side of the vehicle. FIG. 2 shows by way of example a vertical end surface obtained when the vehicle body panel 80 is cut together with the floor carpet 10 along a vertical plane extending in the width direction of the automobile, and FIG. 2 also shows by way of example a vertical end surface obtained when the vehicle body panel 80 is cut together with the floor carpet 10 along a vertical plane extending in the front-rear direction of the automobile.

Figure 1:
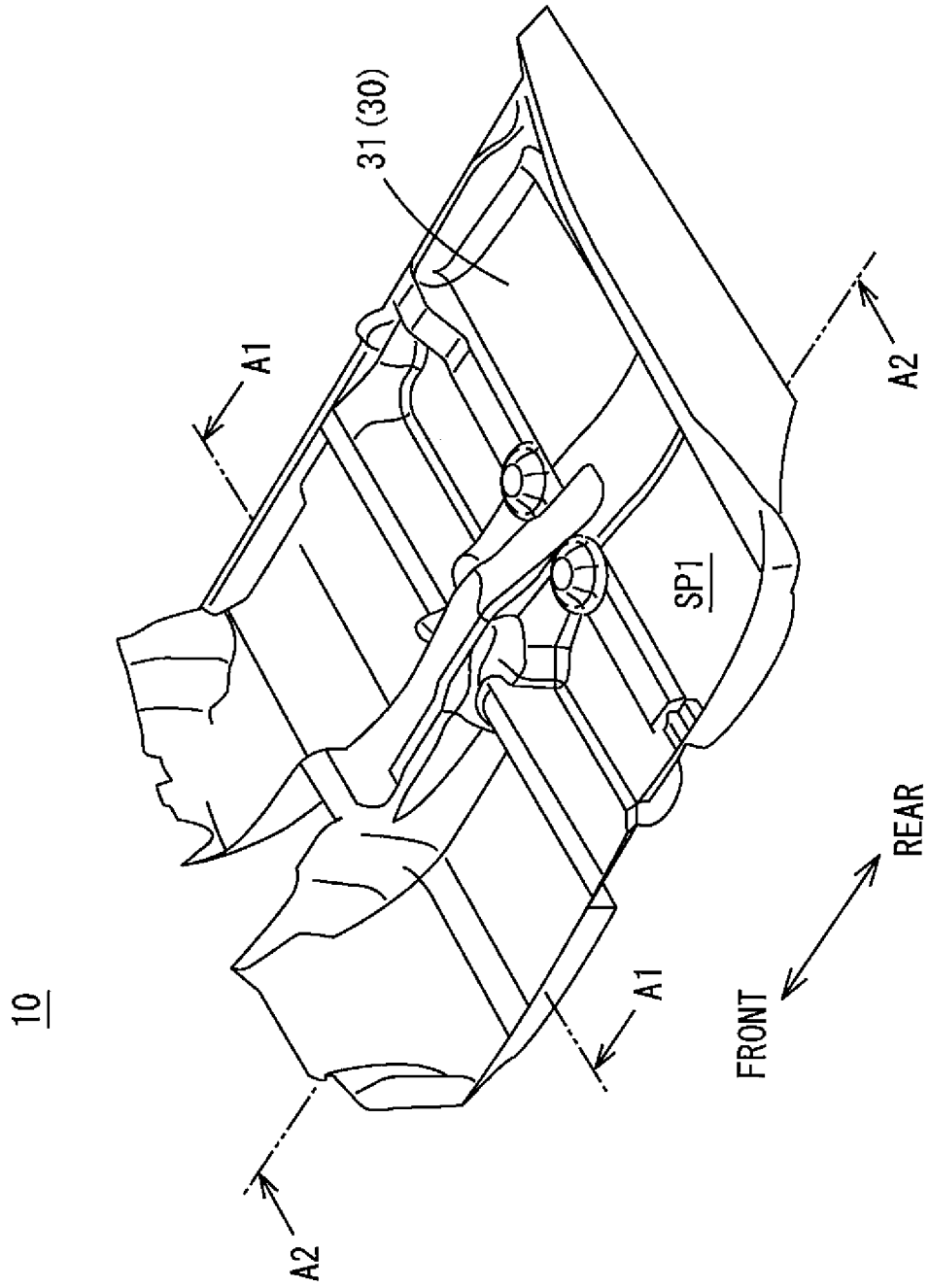
FIG. 1 is an exemplary illustration of a perspective view illustrating an external appearance of a floor carpet (molded laying interior material for a vehicle) 10 according to one embodiment of the present invention on the vehicle compartment SP1 side.
Figure 2:
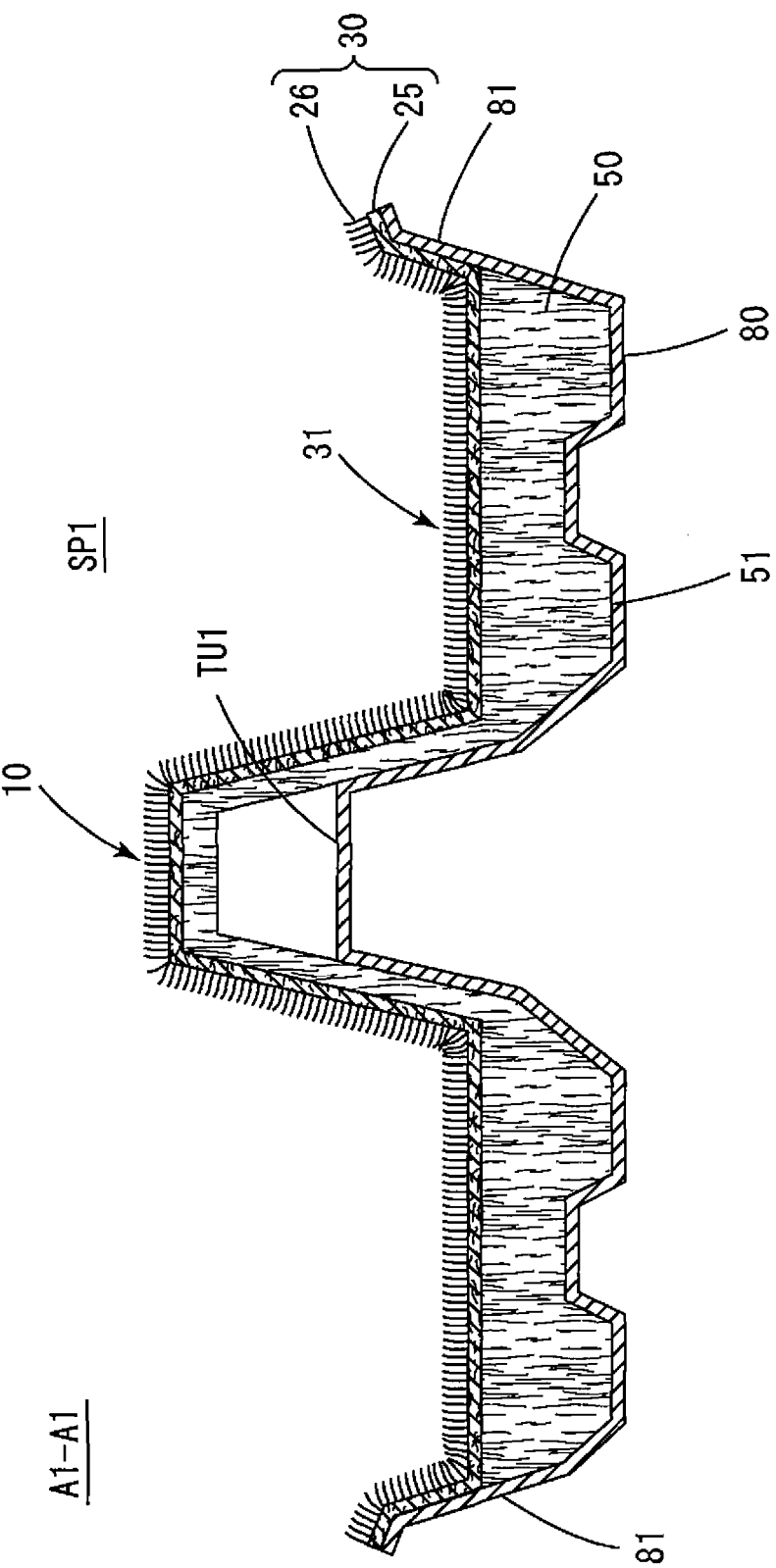
FIG. 2 is an exemplary illustration of a vertical end surface obtained when the floor carpet 10 is cut together with a vehicle body panel 80 in a position corresponding to the A1-A1 line in FIG. 1.
Figure 3:
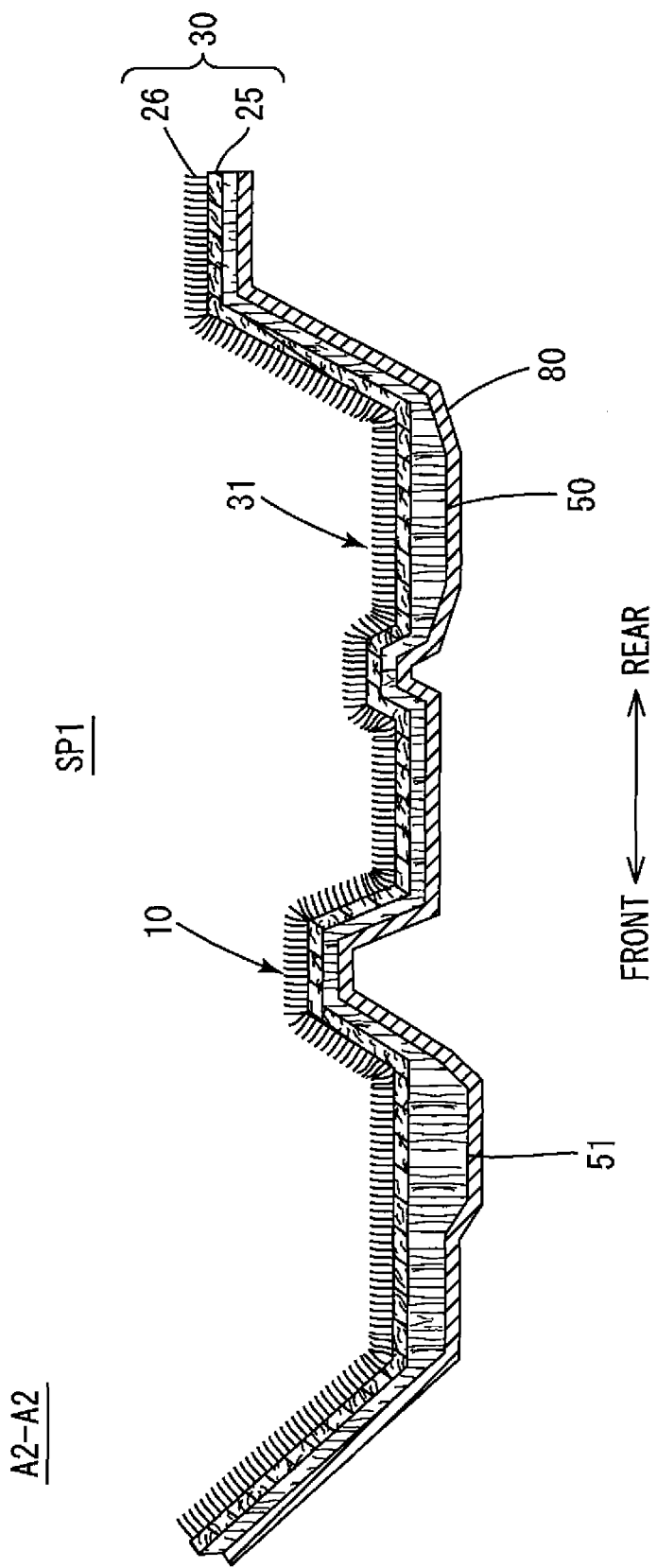
FIG. 3 is an exemplary illustration of a vertical end surface obtained when the floor carpet 10 is cut together with a vehicle body panel 80 in a position corresponding to the A2-A2 line in FIG. 1.

The floor carpet 10 shown in FIG. 1 is a molded laying interior material for a vehicle to be placed on a substantially flat floor panel (a vehicle body panel) constituting a floor surface of the vehicle body and a toe board panel (a vehicle body panel) rising upward from the floor panel surface in a front portion of a passenger compartment. A tunnel portion TU1 extending in the front-rear direction and protruding upward, as shown in FIG. 2, is formed in the central portion of the floor panel or toe board panel in the vehicle width direction. Both edge portions 81, 81 in the width direction of the vehicle body panel 80 shown in FIG. 2 rise up toward the outer side in the vehicle width direction. As shown in FIGS. 2 and 3, the floor carpet 10 is laid on the vehicle compartment SP1 side of the vehicle body panel 80 and decorates the passenger compartment interior. The floor carpet 10 is molded in a three-dimensional shape such as to avoid protruding portions such as a console and a rocker panel and also partially follow the vertical walls thereof.

Figure 4:
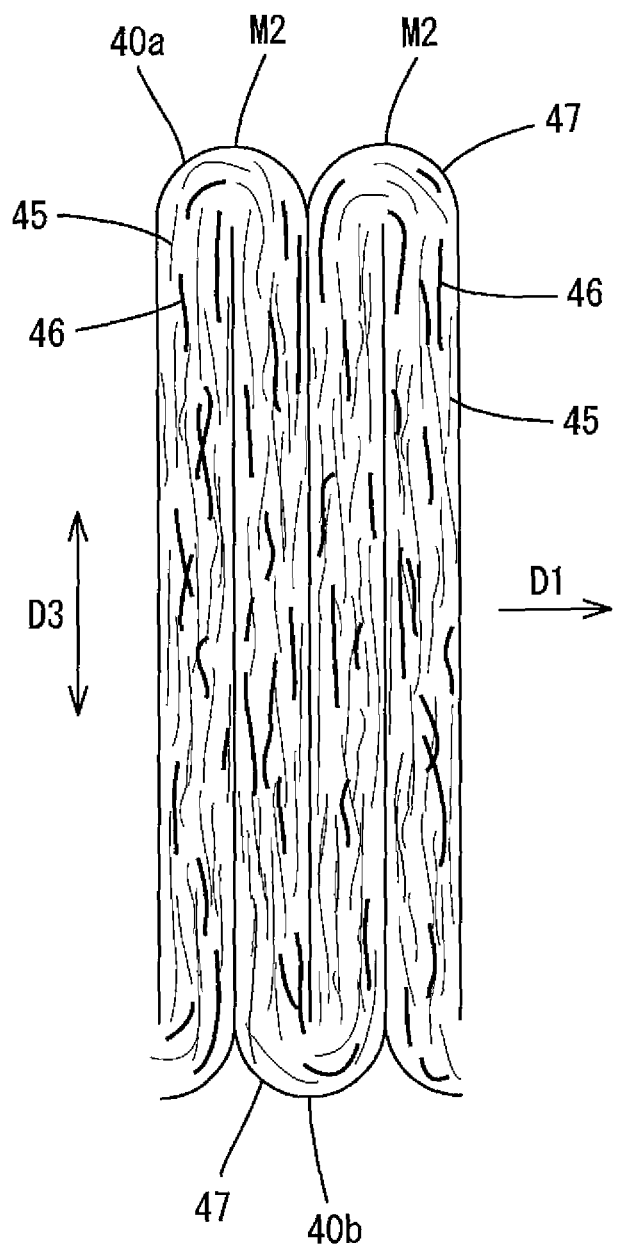
FIG. 4 is an exemplary illustration of a side view illustrating a main portion of a buffer material 40 in which a folded-back portion 47 remains.
Figure 5:
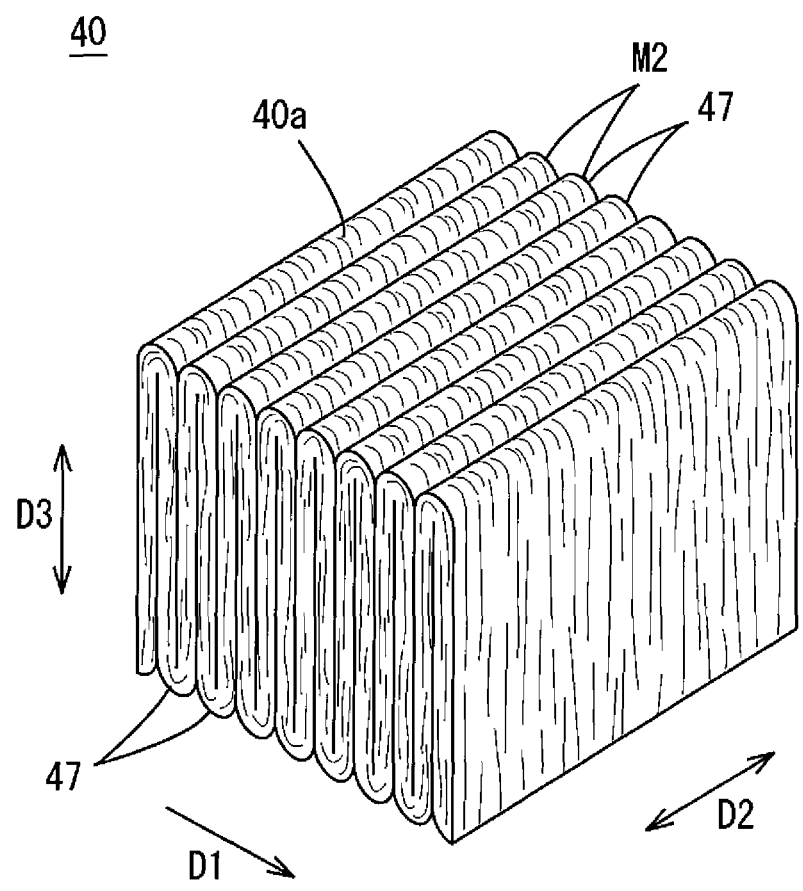
FIG. 5 is an exemplary illustration of a perspective view illustrating a main portion of the buffer material 40 in which the folded-back portion 47 remains.

The basic portion of the floor carpet 10 is constituted by a carpet layer (decorative layer) 30 and a buffer material layer 50. In the carpet layer 30, a first concavo-convex shape 31 is formed on the vehicle compartment SP1 side and disposed to face the vehicle compartment SP1. In the buffer material layer 50, a second concavo-convex shape 51 is formed on the vehicle body panel 80 side and faces the vehicle body panel 80. In the floor carpet 10, the carpet layer 30 in which the concavo-convex shape 31 on the vehicle compartment SP1 side has been formed by press molding an unmolded carpet body (decorative material) 20 (see FIG. 9) that serves as the carpet layer 30 and the buffer material layer 50 in which the concavo-convex shape 51 on the vehicle body panel 80 side has been formed by press molding an unmolded buffer material 40 that serves as the buffer material layer 50 are at least laminated and integrated. The buffer material 40 is a fiber structure in which fibers 45, 46 are oriented in the thickness direction D3, as shown in FIGS. 4 and 5; this feature will be described below in detail.

As shown in FIGS. 2 and 3, there is a portion in which the concavo-convex shape 31 of the carpet layer and the concavo-convex shape 51 of the buffer material layer do not match. As a result, the thickness of the buffer material layer 50 differs depending on a location. In the present floor carpet 10, a fiber structure in which fibers 45, 46 are oriented in the thickness direction D3 is used for the buffer material 40. Therefore, the buffer material layer 50 accommodates to deep molding in the thickness direction D3 and a novel molded laying interior material for a vehicle is obtained.

The carpet layer 30 is a layer imparting the floor carpet 10 with various properties such as decorative property, good feel, and wear resistance. In the carpet layer 30 of the present embodiment, a pile 26 is raised on the vehicle compartment SP1 side of the base layer 25. The carpet layer 30 shown in FIGS. 2 and 3 is a tufted carpet having back stitches of the pile 26 in the base layer 25. It goes without saying that a needle punch carpet in which nonwoven webs are needled to intertwine the fibers and fluff is formed on the surface can be also used.

When the base layer 25 is constituted by a foundation cloth, nonwoven fabrics of various kinds such as span bond nonwoven fabric and knitted materials of various kinds of fibers can be used for the foundation cloth. Synthetic fibers composed of polyesters or polyolefin resins such as PP (polypropylene) and ethylene-propylene copolymer can be used to constitute the foundation cloth.

The base layer 25 may be formed only from the foundation cloth or a backing may be provided on the rear surface (surface on the buffer material layer 50 side) of the foundation cloth. Resin materials (inclusive of elastomers) or fiber materials can be used for the backing. The resin material may be a material including a fiber, or a material composed only of fiber, or a material having an additive added thereto. A material constituting the resin material is preferably a synthetic resin, and more preferably a thermoplastic resin. The thermoplastic resin is preferably a thermoplastic resin with a low melting point (100 to 300° C.), and an olefin resin such as low-density polyethylene, an olefin-based thermoplastic elastomer, and ethylene—vinyl acetate copolymer can be used. Where a thermoplastic material is used for the resin material, when the carpet is press molded to a shape corresponding to that of the vehicle body panel after the backing has been heated and plasticized, the carpet maintains the shape corresponding to that of the vehicle body panel.

Further, fibers of synthetic resins (inclusive of elastomers), fibers obtained by adding an additive to a synthetic resin, and inorganic fibers can be used to constitute the fiber material, and fibers including thermoplastic fibers are preferred. A resin constituting the thermoplastic fibers is preferably a thermoplastic resin with a low melting point, and olefin resins such as low-density polyethylene, olefin-based thermoplastic elastomers, and ethylene—vinyl acetate copolymer can be used. Where the fibers are collected to form a backing having shape retaining ability and air permeability, sound absorption ability of the floor carpet can be improved.

Synthetic fibers, for example, polyester fibers such as polyolefin fibers such as PP fibers, polyamide fibers, and PET (polyethylene terephthalate) fibers, and acrylic fibers can be used for pile yarns constituting the pile 26. A tufted carpet can be formed by punching the fibers of at least one kind selected from the aforementioned fibers through a foundation cloth with a well-known tufting machine and forming a cut pile or loop pile on the foundation cloth surface.

The buffer material layer 50 of the present embodiment is formed from the buffer material 40 having a wavelike shape in which webs M1 are repeatedly folded back in the thickness direction D3. The buffer material layer 50 is a lightweight bulky material having high sound absorption ability. The buffer material layer 50 of the present embodiment is formed from the buffer material 40 including the main fibers 45 and adhesive fibers (binder) 46 and laminated in a range of equal to or greater than 20% of a surface 52 of the floor carpet 10 on the vehicle body panel 80 side. Thus, the buffer material layer 50 may be provided on the entire surface of the floor carpet 10 on the vehicle body panel 80 side or only on part of the surface 52 of the floor carpet 10 on the vehicle body panel 80 side.

A machine for manufacturing a buffer material in which a continuous web is repeatedly folded back into a wavelike shape can be appropriately selected from various buffer material manufacturing apparatuses using a well-known manufacturing method such as a STRUTO method.

For example, a textile lap machine described in Japanese Translation of PCT Application No. 2008-538130 and a machine for repeatedly folding back a continuous web into a wavelike shape by gears are known as the buffer material manufacturing machines.

FIG. 4 is a side view illustrating by way of example a main portion of the buffer material 40 formed by the buffer material manufacturing machine. As shown in FIG. 4, in each pleat M2, the main fibers 45 and the adhesive fibers 46 are oriented in the thickness direction D3, except in the folded-back portion 47. Some of the adhesive fibers 46 are melted and bond together the main fibers 45 with wavelike orientation. As a result, the buffer material 40 with a wavelike fiber structure such as shown in FIG. 5 is formed.

In the formed buffer material 40, as shown in FIG. 5, the folded-back surfaces of the pleats M2 mate with the surfaces passing in the width direction D2 and thickness direction D3 of the buffer material, and the fibers 45, 46 are oriented in the thickness direction D3. A front surface 40a and a rear surface 40b where the folded-back portions 47 are assembled are formed along the lamination direction D1 of the pleats M2. In this case, the orientation of the fibers 45, 46 in the thickness direction D3 means that the orientation directions of the fibers 45, 46 match relatively well with the direction perpendicular to the front surface 40a and rear surface 40b. This includes the presence of folded-back portions 47 of the fibers.

Fibers of synthetic resins (inclusive of elastomers), fibers obtained by adding an additive to synthetic resins, inorganic fibers, and cotton shoddy can be used as the fibers 45, 46 for forming the buffer layer 40. The cotton shoddy means cotton shoddy fibers.

Fibers of thermoplastic resins (inclusive of thermoplastic elastomers), fibers obtained by adding additives to thermoplastic resins, inorganic fibers, and cotton shoddy can be used as the main fibers 45, and fibers composed of thermoplastic resins such as polyesters such as PET, polyolefins such as PP, and polyamides, fibers composed of thermoplastic resins obtained by modifying the aforementioned thermoplastic resins to adjust a melting point thereof, glass fibers, rayon fibers, cotton shoddy of clothing, fibers of materials obtained by further adding additives, and combinations of these fibers can also be used. The diameter of the main fibers 45 can be about 5 to 60 μm, and the length of the main fibers 45 can be about 10 to 100 mm.

When tests were conducted, sound absorption ability of the buffer material 40 was found to be increased when cotton shoddy (preferably, cotton shoddy of clothing) was used at least for some of the main fibers 45.

Fibers of thermoplastic resins and fibers obtained by adding additives to thermoplastic resins can be used as the adhesive fibers 46, and fibers composed of thermoplastic resins such as polyesters such as PET, polyolefins such as PP and PE (polyethylene), and polyamides, fibers composed of thermoplastic resins obtained by modifying the aforementioned thermoplastic resins to adjust a melting point thereof, and fibers of materials obtained by further adding additives can also be used. When the main fibers are thermoplastic fibers, it is preferred that thermoplastic fibers having a melting point lower than that of the main fibers be used for the adhesive fibers. For example, where fibers compatible with the main fibers are used for the adhesive fibers, good adhesion of the main fibers and adhesive fibers can be obtained, and the buffer material layer 50 can be provided with sufficient shape retaining ability. The melting point of the adhesive fibers can be about 100 to 220° C.

Further, fibers of a core-sheath structure in which fibers that can be used for adhesive fibers constitute sheaths and the outer circumference of core portions having a melting point higher than that of the sheaths are surrounded by the sheaths may be also used as the adhesive fibers 46. In this case, fibers that can be used for the main fibers 45 may be used as the core portions.

The diameter of the adhesive fibers 46 can be about 10 to 45 μm, and the length of the adhesive fibers 46 can be about 10 to 100 mm. A compounding ratio of the main fibers 45 and adhesive fibers 46 can be about 30 to 95 wt. % for the main fibers and about 5 to 70 wt. % for the adhesive fibers.

The buffer material 40 may be also formed by using a non-fibrous binder instead of the adhesive binders.

The weight of the buffer material 40 is preferably within a range of 300 to 1500 g/m², more preferably within a range of 500 to 800 g/m². The thickness of the buffer material 40 is appropriately designed according to the vehicle shape within a range of 10 to 50 mm. The density the buffer material 40 is preferably within a range of 0.01 to 0.15 g/cm³, more preferably 0.02 to 0.08 g/cm³.

When the compressive strength of the buffer material 40 was measured, it was 1.5 to 40 kPa when the density was 0.01 to 0.15 g/cm³ and 2 to 15 kPa when the density was 0.02 to 0.08 g/cm³. By contrast, when the compressive strength of the conventional felt in which the fibers were oriented in the direction perpendicular to the thickness direction was measured, it was 2 kPa at a density of 0.055 g/cm³. Further, a compressive strength of 25 kPa was obtained at a density of 0.15 g/cm³ even with an urethane chip molding obtained by scattering a binder such as an isocyanate in a waste such as an urethane slab foam that has been conventionally used mainly as a bulk increasing material, heating, and molding. Thus, the buffer material 40 clearly has a compressive strength similar to that of the conventional products such as urethane chip moldings at the low density.

The aforementioned compressive strength as referred to herein is a value obtained by using a precision universal testing machine AG-500A manufactured by Shimazu KK and measuring a compressive stress at a 25% strain. The measurements are conducted under the following test conditions. The specimen size: 50 mm×50 mm×20 mm (thickness), compression rate: 10 min/min, compression zone: entire surface, and no pre-compression.

The thickness of the buffer material layer 50 after press molding is preferably 50 to 90% the thickness of the buffer material 40 before press molding. The thickness is preferred to be equal to or greater than 50% because the fiber structure in which the fibers are oriented in the thickness direction is unlikely to be fractured by press molding and a higher compressive strength can be obtained. The thickness is also preferred to be equal to or less than 90% because a good repulsion force for bonding with the adjacent layer in press molding is obtained and good adhesive strength is obtained.

Figure 6:
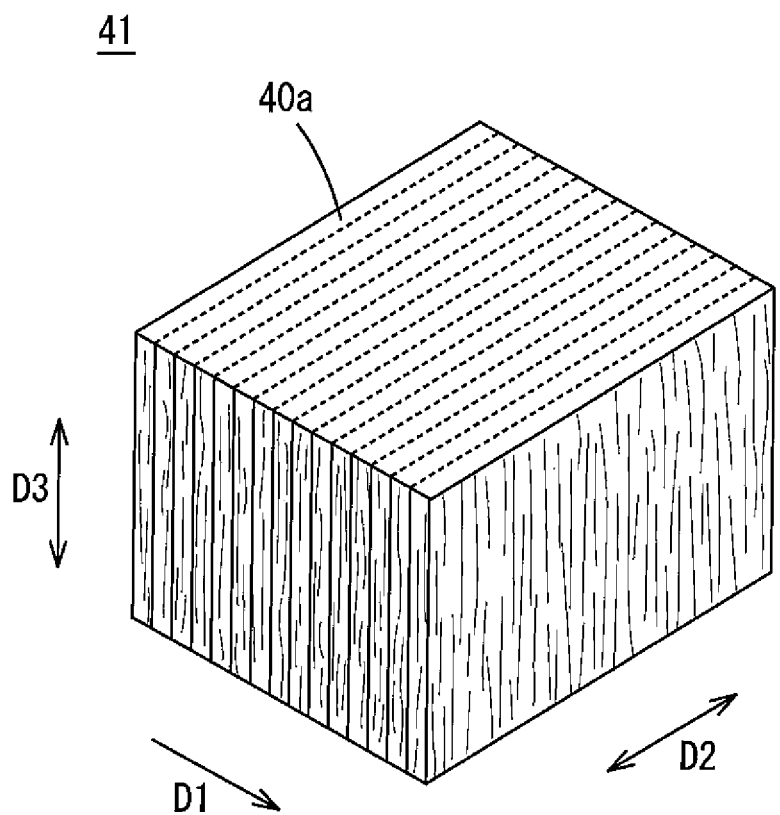
FIG. 6 is an exemplary illustration of a perspective view illustrating a main portion of a buffer material 41 from which the folded-back portions 47 have been cut off.

Any buffer material in which fibers are oriented in the thickness direction may be used for forming the buffer material layer 50. Accordingly, as shown in FIG. 6, the buffer material 41 in which the folded-back portions 47 of the front surface 40a and rear surface 40b of the above-described buffer material 40 are cut out may be used.

Figure 7:
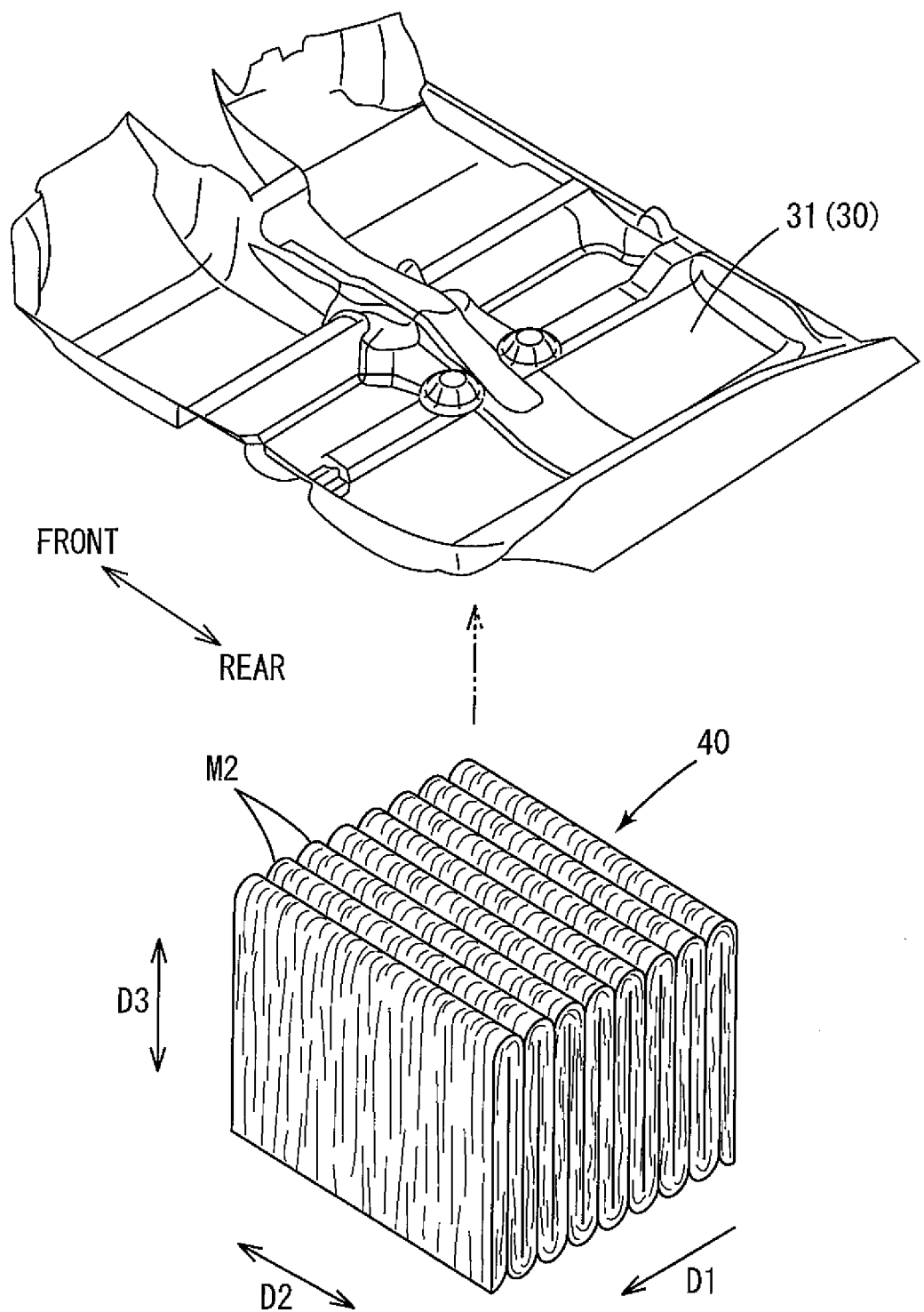
FIG. 7 is an exemplary illustration of an exploded perspective view illustrating the orientation of a lamination direction D1 of pleats M2.

When the decorative layer 30 is a carpet disposed on the bottom of the vehicle compartment SP1 and the buffer material 40 has a wavelike shape in which webs are repeatedly folded back in the thickness direction and pleats M2 are formed, it is preferred that the lamination direction D1 of the pleats M2 of the buffer material 40 that is press molded be in the width direction of the vehicle, as shown in FIG. 7. Thus, the buffer material layer of the floor carpet shown in FIG. 7 can be formed by press molding the buffer material 40 in which the lamination direction D1 of the pleats M2 is in the width direction of the vehicle compartment SP1.

The tunnel portion TU1 extending in the front-rear direction and protruding upward as shown in FIG. 2 is formed in the central portion in the vehicle width direction in the vehicle body panel 80 of the floor portion of the automobile. As a result, the vertical recesses and protrusions in the vertical cross section (for example, the A1-A1 cross section shown in FIG. 2) along the vehicle width direction of the vehicle body panel 80 are larger than the vertical recesses and protrusions in the vertical cross section (for example, the A2-A2 cross section shown in FIG. 3) along the front-rear direction of the vehicle body panel 80. Accordingly, by orienting the lamination direction D1 of the pleats M2 of the buffer material 40 in the vehicle width direction, the pleats M2 are expanded in an accordion fashion during press molding, and therefore the degree of accommodation thereof with the deep concavo-convex shape is improved. As shown in FIG. 2, a similar effect can be also obtained when both edge portions 81, 81 of the vehicle body panel 80 in the vehicle width direction are raised toward the outside in the vehicle width direction.

Figure 8:
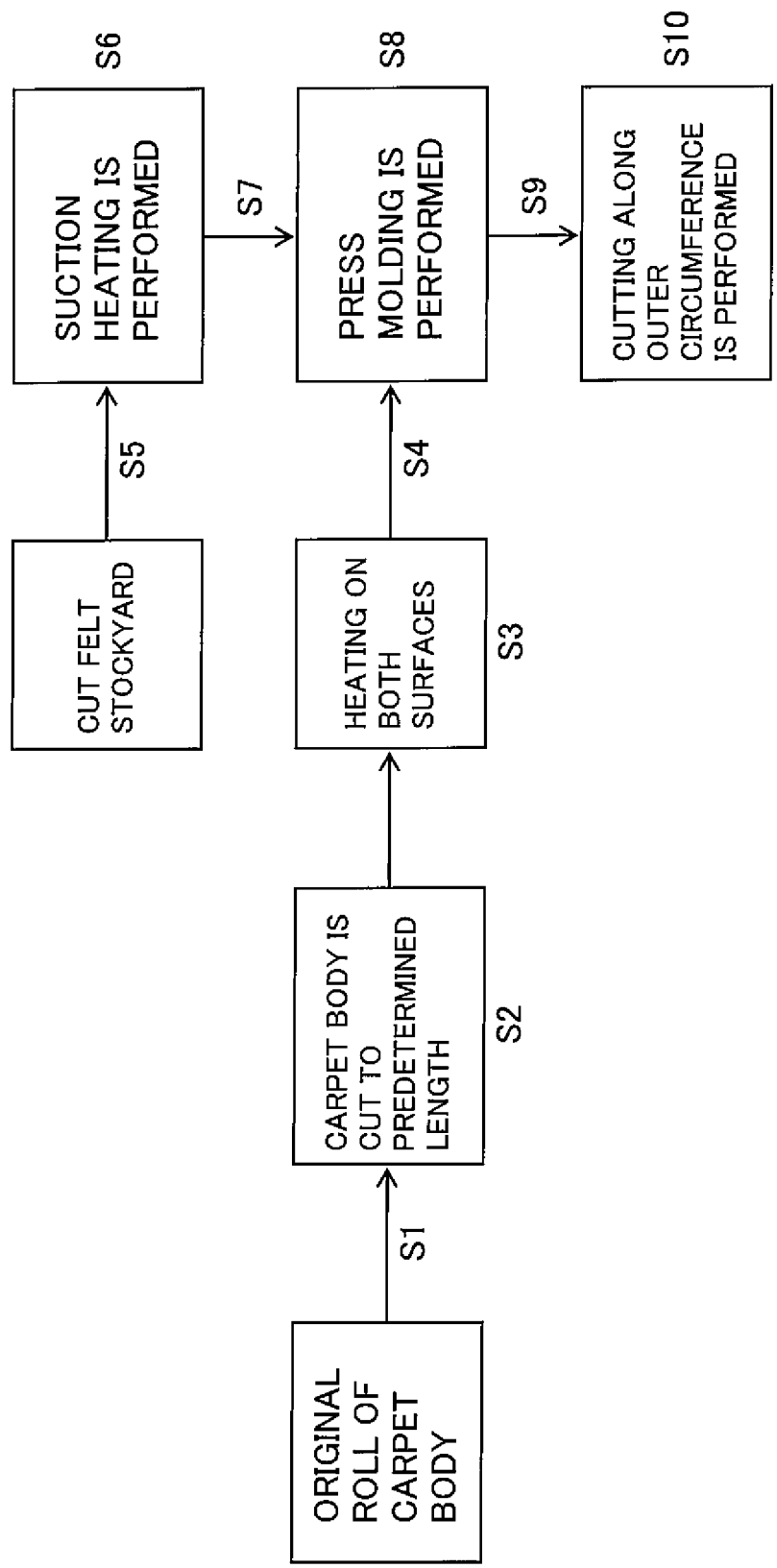
FIG. 8 is an exemplary illustration of a block diagram illustrating schematically a method for manufacturing the floor carpet 10.

(2) Method for Manufacturing Molded Laying Interior Material for Vehicle, Operation, and Effect FIG. 8 illustrates an example of a method for manufacturing the floor carpet 10. The floor carpet manufacturing process of this method is started in a state in which an original roll of the carpet body 20 is placed in a predetermined location, and the unmolded buffer material 40 cut according to the size of the floor carpet 10 to be formed is placed in a cut felt stockyard.

First, the carpet body 20 is conveyed from the original roll of the carpet body to a cutting machine (step S1), and the carpet body 20 is cut to a predetermined length according to the size of the floor carpet 10 to be formed (step S2). The cut carpet body 20 is conveyed to a heating unit such as an infrared radiation heater and heated on both surfaces by radiation heating to soften the base layer 25 (step S3). The heated and softened carpet body 20 is conveyed to a press molding machine 200 such as shown in FIG. 9 (step S4).

Meanwhile, the buffer material 40 is conveyed from the stockyard to a heater such as a suction heater (hot air circulation heater) (step S5) and heated by blowing hot air and softening the adhesive fibers 46 (step S6). The heated buffer material 40 is conveyed to the press molding machine 200 (step S7).

A method for manufacturing the floor carpet 10 is not limited to the above-described method. For example, in step S3, the carpet body 20 may be heated with the suction heater. Further, the carpet body 20 and the buffer material 40 may be stacked and then heated at the same time with the suction heater. In this case, radiation heating with the infrared radiation heater is preferably conducted simultaneously in addition to heating with the suction heater in order to ensure the sufficient amount of heat.

Figure 9:
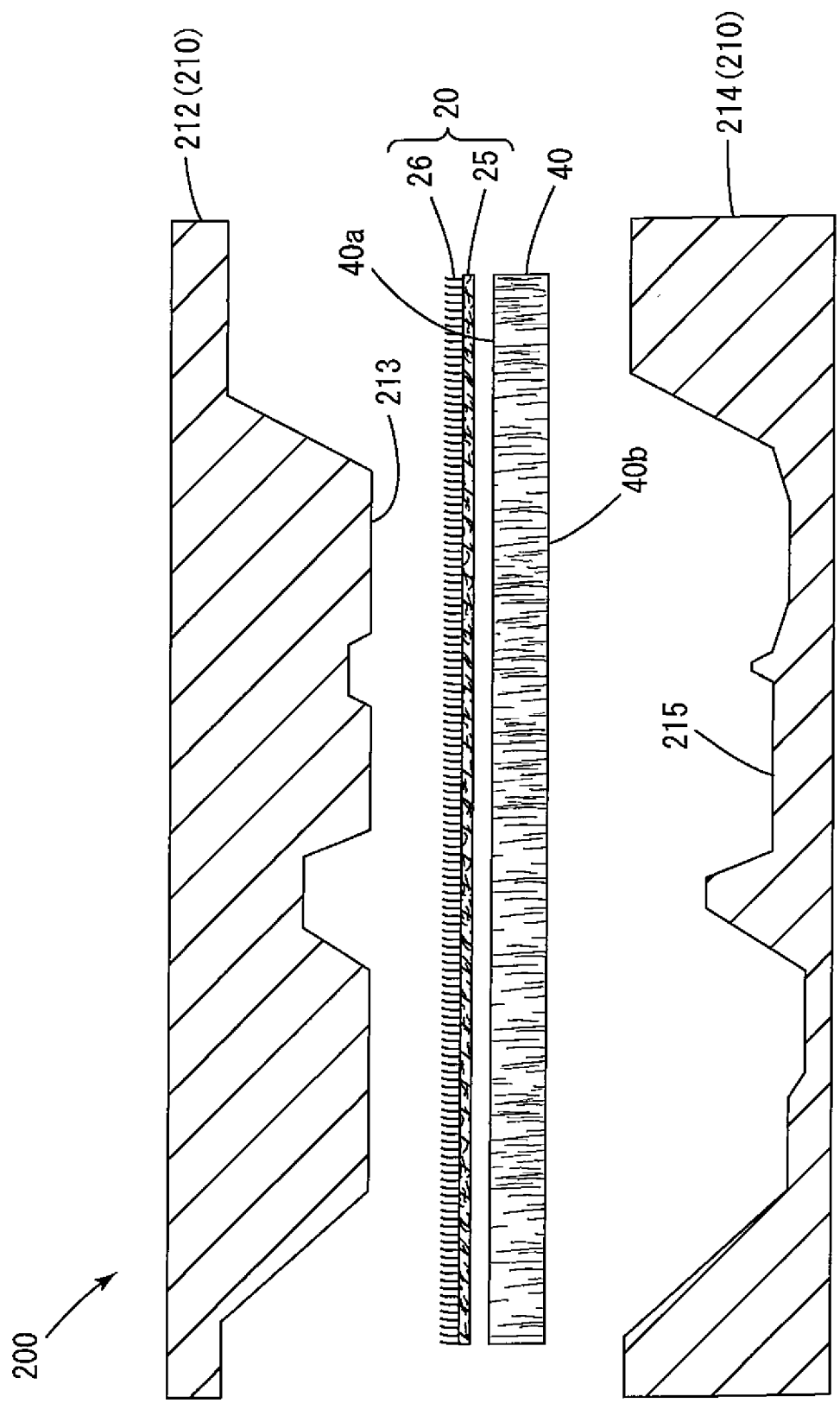
FIG. 9 is a vertical end surface view for illustrating an example of the method for manufacturing the floor carpet 10.

FIG. 9 is a vertical end surface view illustrating schematically how the carpet body 20 and the buffer material 40 are simultaneously press molded in a stacked state thereof. In the press molding machine 200 shown in FIG. 9, an upper mold 212 and a lower mold 214 constituting a press molding die 210 are provided such that they can be brought close to each other and withdrawn from each other. In this configuration, the upper mold 212 is a metal mold having, as the lower surface thereof, a molding surface 213 mating with the concavo-convex shape 31 of the floor carpet on the vehicle compartment side. The lower mold 214 is a metal mold having, as the upper surface thereof, a molding surface 215 mating with the concavo-convex shape 51 of the floor carpet on the vehicle body panel side. The heated carpet body 20 and buffer material 40 are arranged so that the carpet body 20 is disposed on the upper mold 212 side and the buffer material 40 is disposed on the lower mold 214 side. It is obvious that the base layer 25 of the carpet body and the front surface 40a (or rear surface 40b) of the buffer material are disposed opposite each other, the pile 26 of the carpet body is disposed opposite the upper mold 212, and the rear surface 40b (or front surface 40a) of the buffer material is disposed opposite the lower mold 214. When the two molds 212, 214 having the carpet body 20 and the buffer material 40 disposed therebetween are brought close to each other, the untrimmed floor carpet 10 is press molded. This step corresponds to step S8 shown in FIG. 8.

When the buffer material 40 includes a binder such as the adhesive fibers 46, the carpet layer 30 and the buffer material layer 50 are bonded together by the binder of the buffer material 40 even when the base layer 25 of the carpet body has no adhesive backing.

Figure 10:
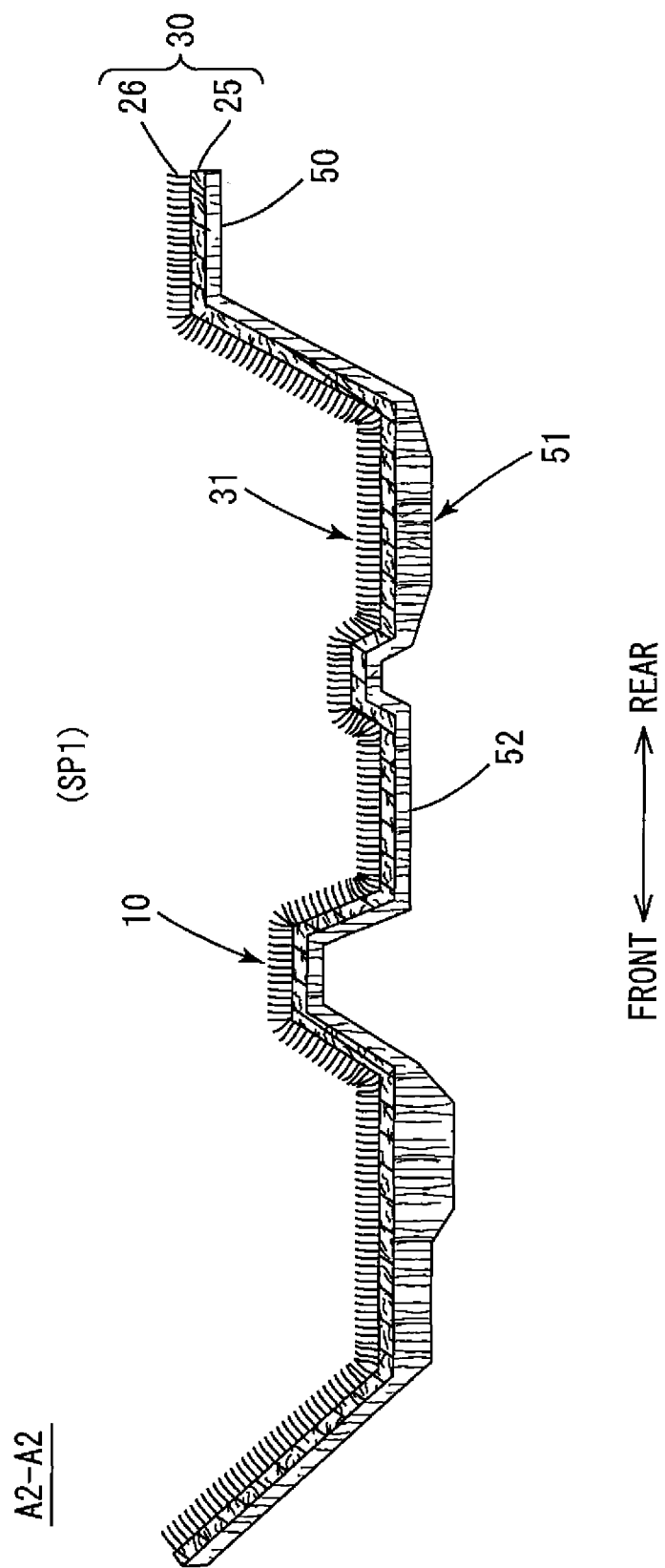
FIG. 10 is an exemplary illustration of a vertical end surface obtained when the press-molded floor carpet 10 is cut in a position corresponding to the A2-A2 line in FIG. 1.

The untrimmed floor carpet 10 is taken out of the press molding machine 200 after cooling and conveyed to an outer circumference cutting machine (step S9). After removal from the mold, the untrimmed floor carpet 10 is cut on the outer circumference thereof by the outer circumference cutting machine (step S10). As a result, the floor carpet 10 such as shown in FIG. 10 is formed. The cutting method in step S10 can involve cutting with a cutting blade or water jet cutting. It is also possible to omit steps S9 and S10, bring the molds 212, 214 close to each other in step S8, perform press molding of the floor carpet 10, and manually cut the outer circumference in this state by using a cutter.

Since the fiber structure in which the fibers are oriented in the thickness direction D3 is used for the buffer material 40 for forming the floor carpet 10, the buffer material layer 50 accommodates to deep molding in the thickness direction D3 when the buffer material 40 is press molded and the thickness of the buffer material layer 50 is locally changed. As a result, the concavo-convex shape 51 on the vehicle body panel 80 side is formed by the aforementioned press molding in the buffer material layer 50, and this concavo-convex shape 51 is maintained by the fixed adhesive fibers 46. Obviously, the concavo-convex shape 31 on the vehicle compartment SP1 side is formed by the aforementioned press molding on the carpet layer 30, and the concavo-convex shape 31 of the pile 26 is maintained by the fixed base layer 25. Therefore, in the floor carpet 10 to be formed, the carpet layer 30 maintained in the concavo-convex shape 31 and the buffer material layer 50 maintained in the concavo-convex shape 51 are at least laminated and integrated.

As described hereinabove, in the molded laying interior material for a vehicle exemplified by the floor carpet 10, the buffer material layer accommodating to the recesses and protrusions of the vehicle body panel is integrally molded simultaneously with the press molding of the molded laying interior material for a vehicle. Therefore, it is not necessary to post-apply the felt as in the conventional process and the number of manufacturing steps and the production cost can be reduced. In addition the displacement of the buffer material layer can be reduced as much as possible. Further, since a fiber molded body in which the fibers are oriented in the thickness direction are used for the buffer material layer, deep drawing deformation in the thickness direction is possible, and a novel molded laying interior material for a vehicle can be provided having integrated therein a buffer material layer accommodating deep recesses and protrusions formed in the vehicle body panel.

When the constituent fibers of the felt are oriented parallel to the rear surface of the carpet body as in the conventional configuration, where passenger's feet apply continuously a force in the thickness direction, the so-called "loss of springiness" occurs, that is, the felt sags in the thickness direction and the original thickness cannot be restored. For this reason, the conventional felt has to have a high density to ensure the required feel such as stepping comfort. As a result, the product weight of the conventional floor carpets increases and a plurality of felts that differ in thickness to correspond to the concavo-convex shape of the vehicle body panel have to be attached to the rear surface. As a consequence, a difference in flow resistance in the thickness direction between different locations in the floor carpet increases and optimum design of soundproofing performance is difficult to perform.

In the present molded laying interior material for a vehicle, the fibers of buffer material layer are arranged in the thickness direction and therefore a repulsion force in the thickness direction is strong and the required stepping comfort and resistance to loss of springiness can be ensured at a density lower than that in the conventional molded laying interior materials. Thus, an excellent effect demonstrated by the present molded laying interior material for a vehicle is that density, weight, and cost can be reduced.

Further, the present molded laying interior material for a vehicle makes it possible to reduce the buffer material in weight by comparison with the conventional felt. Therefore, it is not necessary to apply a high pressure during molding and the molding cost can be reduced.

(3) Variation Examples

The following variation examples of the present invention can be considered.

In addition to the floor carpet, the molded laying interior materials for a vehicle to which the present invention can be applied include side wall trims such as door trims, luggage side trim, and pillar garnish interior material and also dash silencer and a roof liner interior material. Therefore, the decorative material for forming the decorative layer may be not only the carpet base, but also a nonwoven fabric, a woven material, a knitted material, and leather. The decorative layer such as a nonwoven fabric layer, a woven layer, a knitted layer, and a leather layer can be formed from these decorative materials.

The above-described decorative layer and buffer material layer may be press molded separately and then adhesively bonded. Alternatively, a buffer material layer may be formed by press molding only the buffer material and the buffer material layer and the decorative material may thereafter be at least laminated and press molded together. Yet another option is to form a decorative layer by press molding only the decorative material, and then at least laminate the decorative layer and buffer material and press mold them together. The molded laying interior materials for a vehicle formed by these methods are also included in the present invention.

In the molded laying interior material for a vehicle, a separate layer may be provided between the decorative layer and the buffer material layer.

Figure 11:
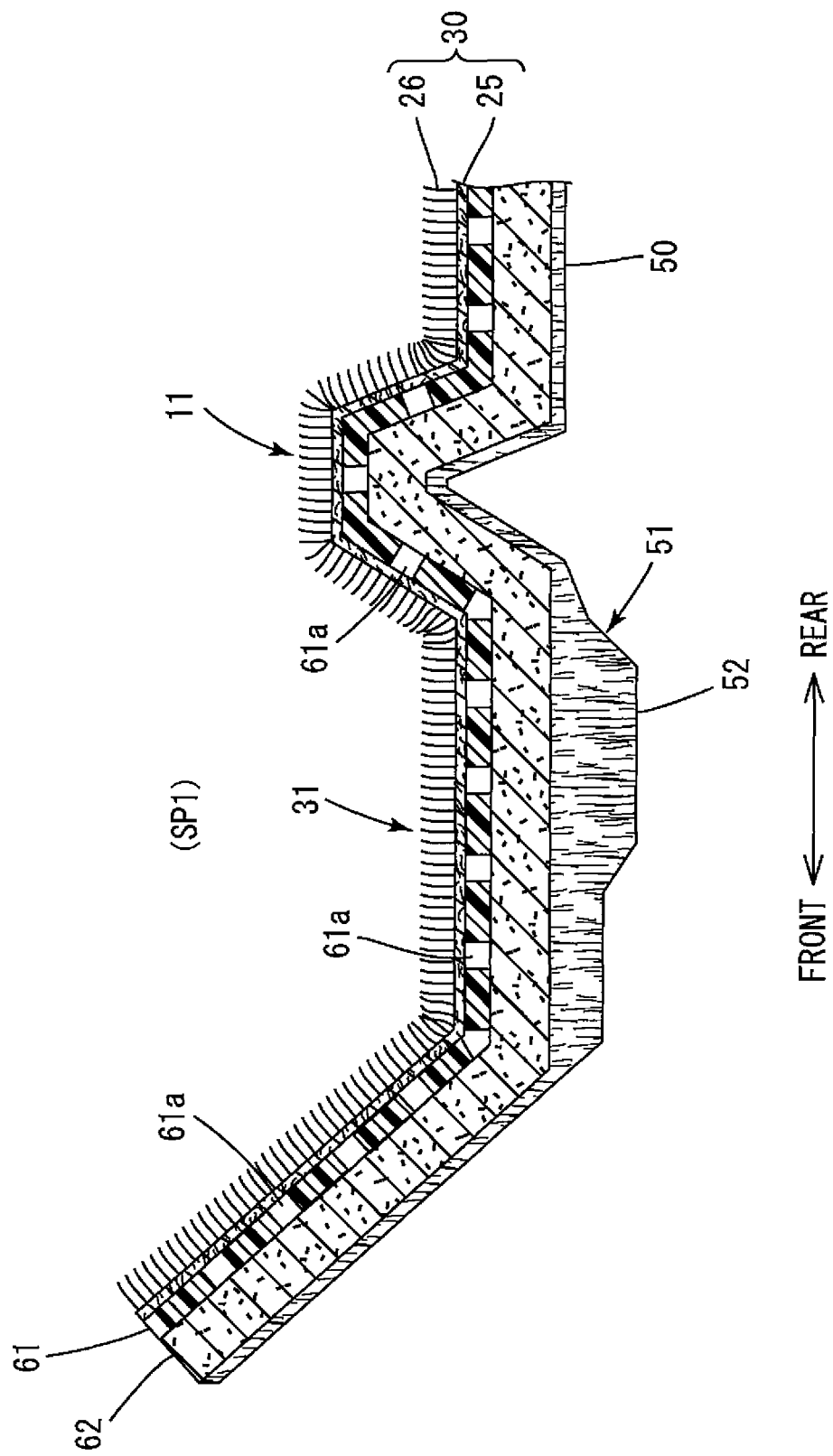
FIG. 11 is an exemplary illustration of a vertical end surface obtained when a floor carpet 11 according to a variation example is cut in a position corresponding to the A2-A2 line in FIG. 1.

FIG. 11 shows a floor carpet 11 in which a perforated resin layer 61 and a sound absorbing layer 62 are provided between the carpet layer (decorative layer) 30 and the buffer material layer 50. In the floor carpet 11 shown in FIG. 11, a vertical end surface is shown that is obtained by cutting in a position corresponding to A2-A2 in FIG. 1. In the present floor carpet 11, the carpet layer (decorative layer) 30, perforated resin layer 61, sound absorbing layer 62, and buffer material layer 50 are laminated and integrated in the order of description from the vehicle compartment SP1 towards the vehicle body panel 80.

The carpet body (decorative material) 20 (see FIG. 9) for forming the carpet layer 30 of the present variation example has air permeability in the thickness direction of the carpet body 20. This air permeability is preferably 50 to 500 N·s/m³ as a flow resistance value (flow resistance value stipulated by ISO 9053) in the thickness direction of the carpet body 20. The air permeability of the carpet body 20 can be adjusted by providing no backing that inhibits air permeability on the base layer 25 of the carpet body and adjusting the fiber length or fiber diameter of the pile 26 or adjusting the degree of needling when a needle punch carpet is produced.

The perforated resin layer 61 has a plurality of holes 61a passing through in the thickness direction and bonds together the carpet layer 30 and the sound absorbing layer 62 in a state of high air permeability. The material forming the perforated resin layer 61 may be constituted only by a resin (including elastomers), or may be a material additionally containing an additive. The resin is preferably a synthetic resin and more preferably a thermoplastic resin. The thermoplastic resin is preferably a thermoplastic resin with a low melting point (100 to 300° C.), and an olefin resin such as PE and PP, an olefin thermoplastic elastomer, and a modified polyester can be used.

The perforated resin layer 61 can be formed by forming a large number of small holes in a film of the above-described material.

The diameter of holes 61a of the perforated resin layer can be about 0.5 to 3 mm. The number of the holes 61a per unit surface area can be about 40 to 500 holes/cm². From the standpoint of demonstrating good sound absorption performance, it is preferred that the flow resistance value of the perforated resin layer 61 be 300 to 3500 N·s/m³. The flow resistance value of the perforated resin layer 61 can be set within the aforementioned range by adjusting the diameter of each hole 61a and the number of holes 61a. For example, where the diameter of each hole 61a is increased and the number of holes 61a is increased, the flow resistance value can be decreased, and where the diameter of each hole 61a is decreased and the number of holes 61a is decreased, the flow resistance value can be increased.

The sound absorbing layer 62 is laminated between the perforated resin layer 61 and the buffer material layer 50. The sound absorbing layer 62 is imparted with sound absorption ability and maintains the shape of the floor carpet 11. The sound absorbing layer 62 has a rigidity higher than that of the carpet layer 30, and the shape of the floor carpet 11 can be substantially maintained by forming the sound absorbing layer 62 during press molding.

When the sound absorbing layer 62 is obtained by collecting and molding fibers, fibers composed of synthetic resins (inclusive of elastomers), fibers obtained by adding an additive to the synthetic resin, inorganic fibers, and cotton shoddy can be used as the fibers. Fibers composed of thermoplastic resins such as polyesters such as PET, polyolefins such as PP, and polyamides, fibers composed of thermoplastic resins obtained by modifying the aforementioned thermoplastic resins to adjust a melting point thereof, glass fibers, rayon fibers, cotton shoddy of clothing, fibers of materials obtained by further adding additives, and combinations of these fibers can also be used. The diameter of the main fibers can be about 5 to 60 μm, and the length can be about 10 to 100 mm.

The thickness of the sound absorbing layer 62 can be about 2 to 5 mm. The density of the sound absorbing layer 62 can be 50 to 300 kg/m³. The flow resistance value of the sound absorbing layer 62 is preferably 50 to 500 N·s/m³.

The present floor carpet 11 can be manufactured, for example, in the following manner.

First, a resin material to be formed as the perforated resin layer 61 is extruded into a film, laid on an unmolded sound absorbing material to be formed as the sound absorbing layer 62, and the layers are laminated by rolling under a pressure with a roller or the like. Then, a predetermined number of holes 61a of a predetermined diameter are formed in the resin film with a perforating machine having a large number of hot needles provided in a protruding condition on the outer circumference of an elongated drum. The air-permeable carpet body 20 is then laid so that the base layer 25 faces the resin film side of the laminate, the buffer material 40 in which the fibers 45, 46 are oriented in the thickness direction D3 is laid on the sound absorbing material side of the laminate, and the laminate, carpet body 20, and buffer material layer 50 are simultaneously heated in this state by a hot air flow with a suction heater. After the heating, the laminate, carpet body 20, and buffer material layer 50 are conveyed between the molds 212, 214 such as shown in FIG. 9, and press molding is performed. Upon cooling, the untrimmed floor carpet 11 is conveyed to an outer circumference cutting machine and the outer circumference is cut with a water jet, thereby forming the floor carpet 11.

The above-described method for manufacturing the floor carpet 11 can be also performed according to the procedure disclosed in Japanese Patent Application Laid-open No. 2007-161153. When the holes 61a are formed in the resin film, they may be formed with a perforating machine before the resin film is laid on the sound absorbing material. Unheated needles may be used for perforation instead of the hot needles.

As described in Japanese Patent Application Laid-open No. 2007-161153, the perforated resin layer may be also formed by a powder system, a melt fiber system, or a normal temperature needling system.

As described hereinabove, in the molded laying interior material for a vehicle exemplified by the floor carpet 11, the perforated resin layer is provided between the decorative layer and the buffer material layer and the decorative layer is made air permeable, thereby introducing and absorbing the sound from the vehicle compartment in the sound absorbing layer or buffer material layer. Thus, the sound from the vehicle compartment that is reflected by the molded laying interior material for a vehicle and returned into the vehicle compartment is reduced and therefore sound absorption ability of this molded laying interior material for a vehicle is improved.

Further, air permeability of the molded laying interior material for a vehicle can be controlled by the perforated resin layer, and sound absorption ability corresponding to a vehicle can be provided. In this case, the buffer material layer has a low density because it is constituted by a fiber molded body in which fibers are oriented in the thickness direction, and therefore a repulsion force in zones with a large compression amount can be reduced during press molding and the probability of the holes in the perforated resin layer being collapsed and closed can be reduced as much as possible.

Further, since the buffer material layer 50 excels in cushioning ability in the thickness direction, a constant repulsion force can be obtained even in the zones with a small compression amount. Therefore, the probability of buffer material layer peeling off due to insufficient adhesiveness can be reduced.

An air impermeable resin layer may be laminated between the sound absorbing layer 62 and the buffer material layer 50. The air impermeable resin layer is a soundproofing layer and prevents noise from penetrating from the outside of the vehicle into the vehicle compartment. As a result, quietness inside the vehicle compartment can be increased. Further, the air impermeable resin layer also has a function of bonding the sound absorbing layer 62 and the buffer material layer 50 together.

Figure 12:
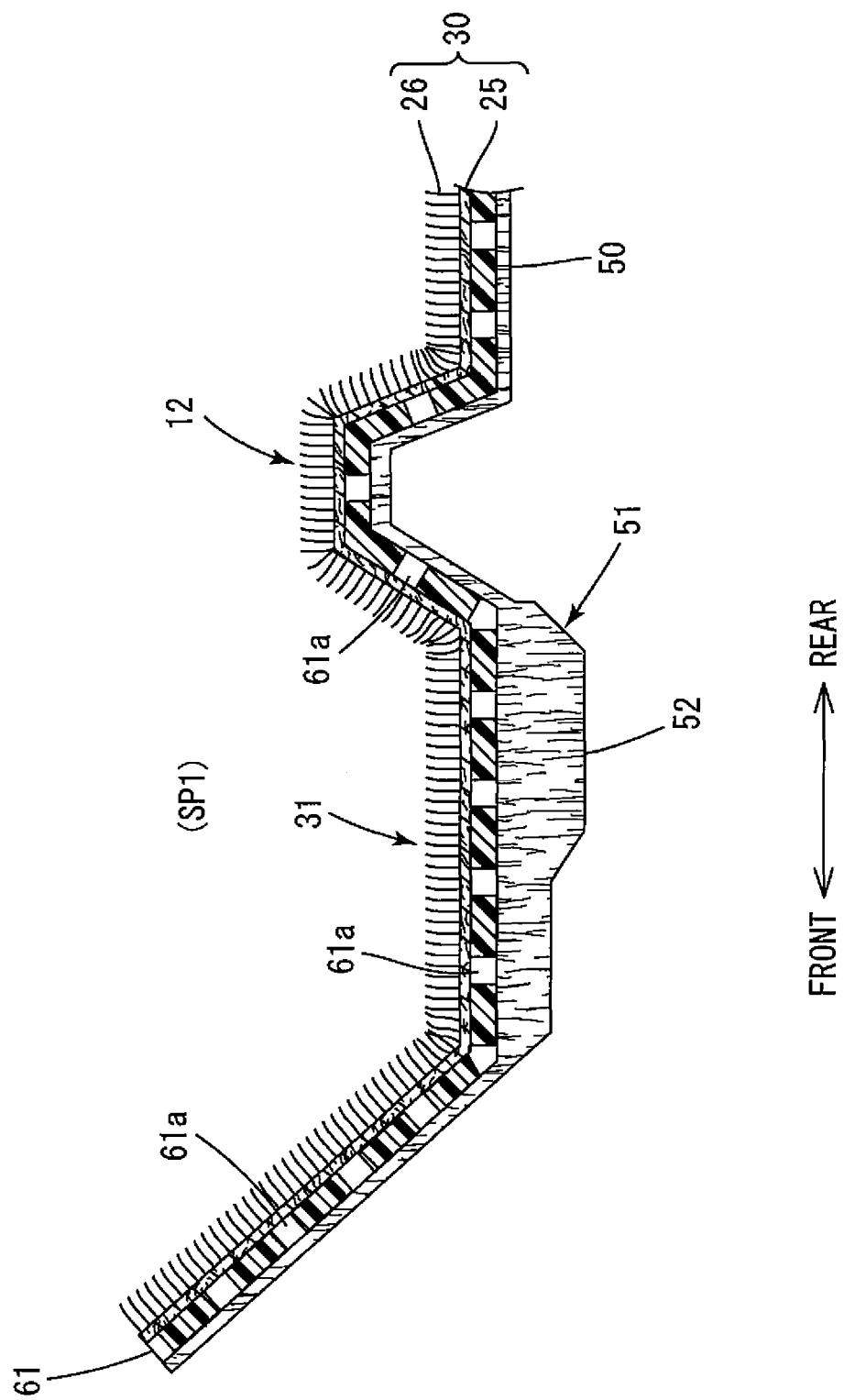
FIG. 12 is an exemplary illustration of a vertical end surface obtained when a floor carpet 12 according to a variation example is cut in a position corresponding to the A2-A2 line in FIG. 1.

Further, FIG. 12 shows a floor carpet 12 in which only the perforated resin layer 61 is provided between the carpet layer (decorative layer) 30 and the buffer material layer 50. The floor carpet 12 shown in FIG. 12 is also represented by the vertical end surface obtained by cutting in a position corresponding to A2-A2 in FIG. 1. Thus, the floor carpet 12 is obtained by laminating and integrating the carpet layer (decorative layer) 30, perforated resin layer 61, and buffer material layer 50 in the order of description from the vehicle compartment SP1 to the vehicle body panel 80. The layers can be constituted in the same manner as in the floor carpet 11 shown in FIG. 11.

The present floor carpet 12 can be manufactured, for example, in the following manner.

First, a resin material to be formed as the perforated resin layer 61 is extruded into a film and laid on the buffer material 40, and the layers are laminated by rolling under a pressure with a roller or the like. Then, a predetermined number of holes 61a of a predetermined diameter are formed in the resin film with a perforating machine having a large number of hot needles provided in a protruding condition on the outer circumference of an elongated drum. The air-permeable carpet body 20 is then laid so that the base layer 25 faces the resin film side of the laminate, and the laminate and the carpet body 20 are simultaneously heated in this state by a hot air flow with a suction heater. After the heating, press molding is performed. Upon cooling, the outer circumference is cut and the floor carpet 12 is formed. The above-described method for manufacturing the floor carpet 12 can be also performed according to the procedure disclosed in Japanese Patent Application Laid-open No. 2007-161153.

In the molded laying interior material for a vehicle exemplified by the floor carpet 12, the perforated resin layer is provided between the decorative layer and the buffer material layer and the decorative layer is made air permeable, thereby introducing and absorbing the sound from the vehicle compartment in the buffer material layer. Thus, the sound from the vehicle compartment that is reflected by the molded laying interior material for a vehicle and returned into the vehicle compartment is reduced and therefore sound absorption ability of this molded laying interior material for a vehicle is improved.

Figure 13:
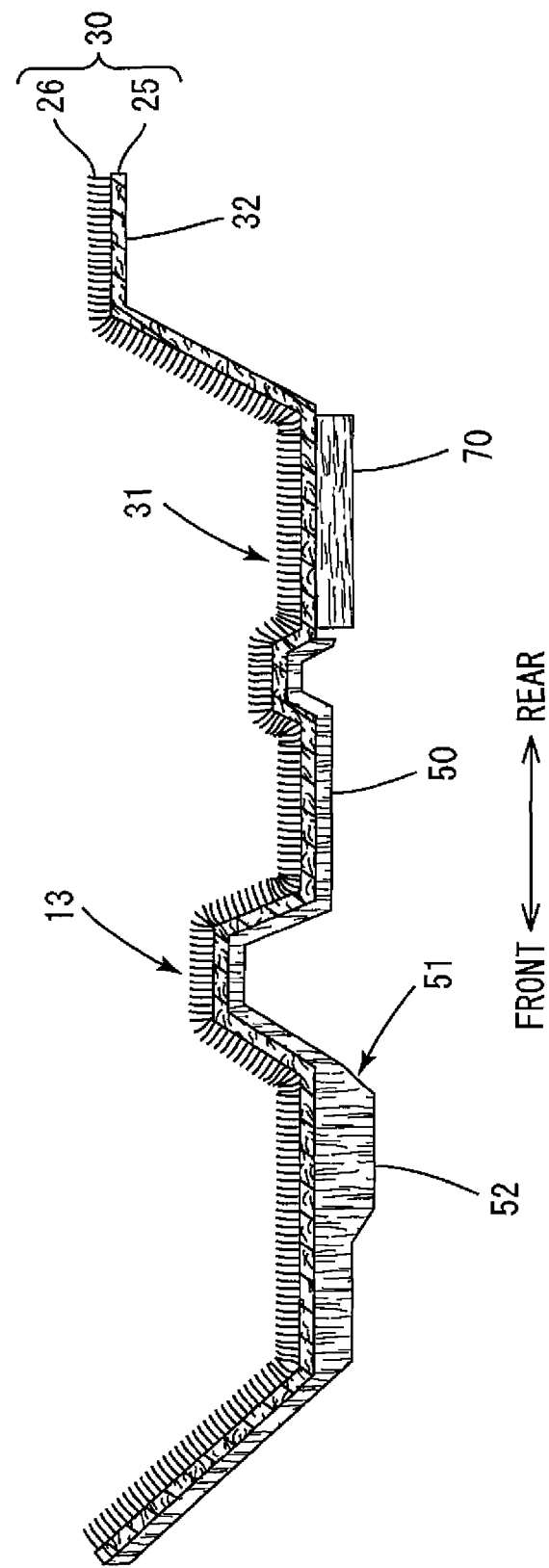
FIG. 13 is an exemplary illustration of a vertical end surface obtained when a floor carpet 13 according to a variation example is cut in a position corresponding to the A2-A2 line in FIG. 1.

Moreover, FIG. 13 shows a floor carpet 13 in which felt 70 is post-applied to a surface 32 on the vehicle body panel 80 side. In the present floor carpet 13, the buffer material layer 50 is laminated on part of the surface on the vehicle body panel 80 side, for example, within a range of 30 to 70%. In the present floor carpet 13, the felt 70 is post-applied, after the press molding, to the surface 32 on the vehicle body panel 80 side where the buffer material layer 50 is not provided. The felt 70 may be the conventional felt in which the constituent fibers are oriented substantially parallel to the felt surface, or a fiber structure in which the constituent fibers are oriented in the thickness direction as in the above-described buffer material 40. Further, the felt 70 may be a flat felt or a molded felt.

By using the felt 70, it is possible to accommodate to a changed shape of the automobile floor surface, without changing the press molding die. For example, the concavo-convex shape of the floor surface can be somewhat different depending on the grade even in the same vehicle such as in a case where a duct may or may not be set on a floor panel. With the molded laying interior material for a vehicle exemplified by the floor carpet 13, even if the shape of the vehicle body panel is partially changed, the same molding die can be used if the felt is post-applied, thereby increasing the degree of freedom in designing the rear surface shape of the molded laying interior material for a vehicle and reducing the production cost.

The felt 70 may be also post-applied, after the press molding, to the surface 52 on the vehicle body panel 80 side on which the buffer material layer 50 is provided.

Figure 14:
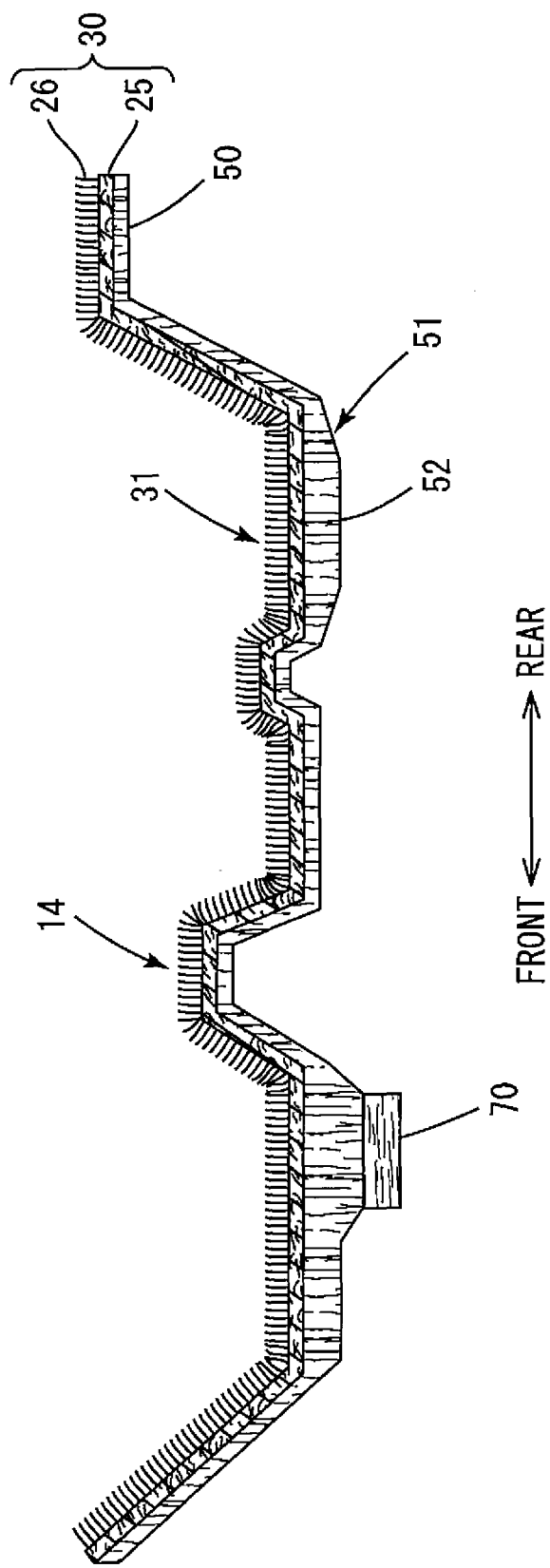
FIG. 14 is an exemplary illustration of a vertical end surface obtained when a floor carpet 14 according to a variation example is cut in a position corresponding to the A2-A2 line in FIG. 1.

FIG. 14 shows a floor carpet 14 in which the felt 70 has been post-applied to the surface 52 of the buffer material layer 50 on the vehicle body panel 80 side. The felt 70 is the conventional felt in which the constituent fibers are oriented substantially parallel to the felt surface.

Figure 15:
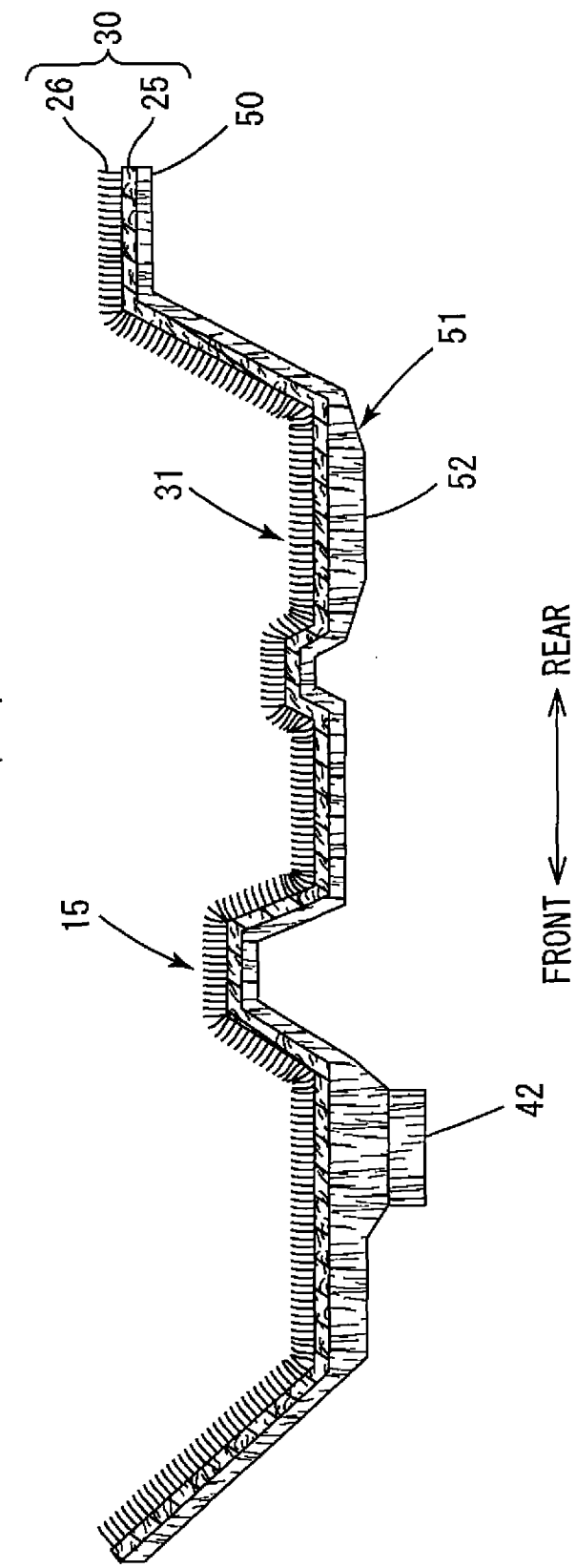
FIG. 15 is an exemplary illustration of a vertical end surface obtained when a floor carpet 15 according to a variation example is cut in a position corresponding to the A2-A2 line in FIG. 1.

FIG. 15 shows a floor carpet 15 in which the buffer material 42 is post-applied to the surface 52 of the buffer material layer 50 on the vehicle body panel 80 side. This buffer material 42 is a fiber structure in which the constituent fibers are oriented in the thickness direction as in the above-described buffer material 40.

With the molded laying interior material for a vehicle exemplified by the floor carpets 14, 15, the felt 70 or buffer material 42 can accommodate to the deep concavo-convex shape of the vehicle body panel when deep recesses are locally present in the vehicle body panel and the same molding die can be used. Therefore, in the present variation example, good feel of the molded laying interior material for a vehicle, such as stepping comfort of the floor carpet, can be ensured.

Figure 16:
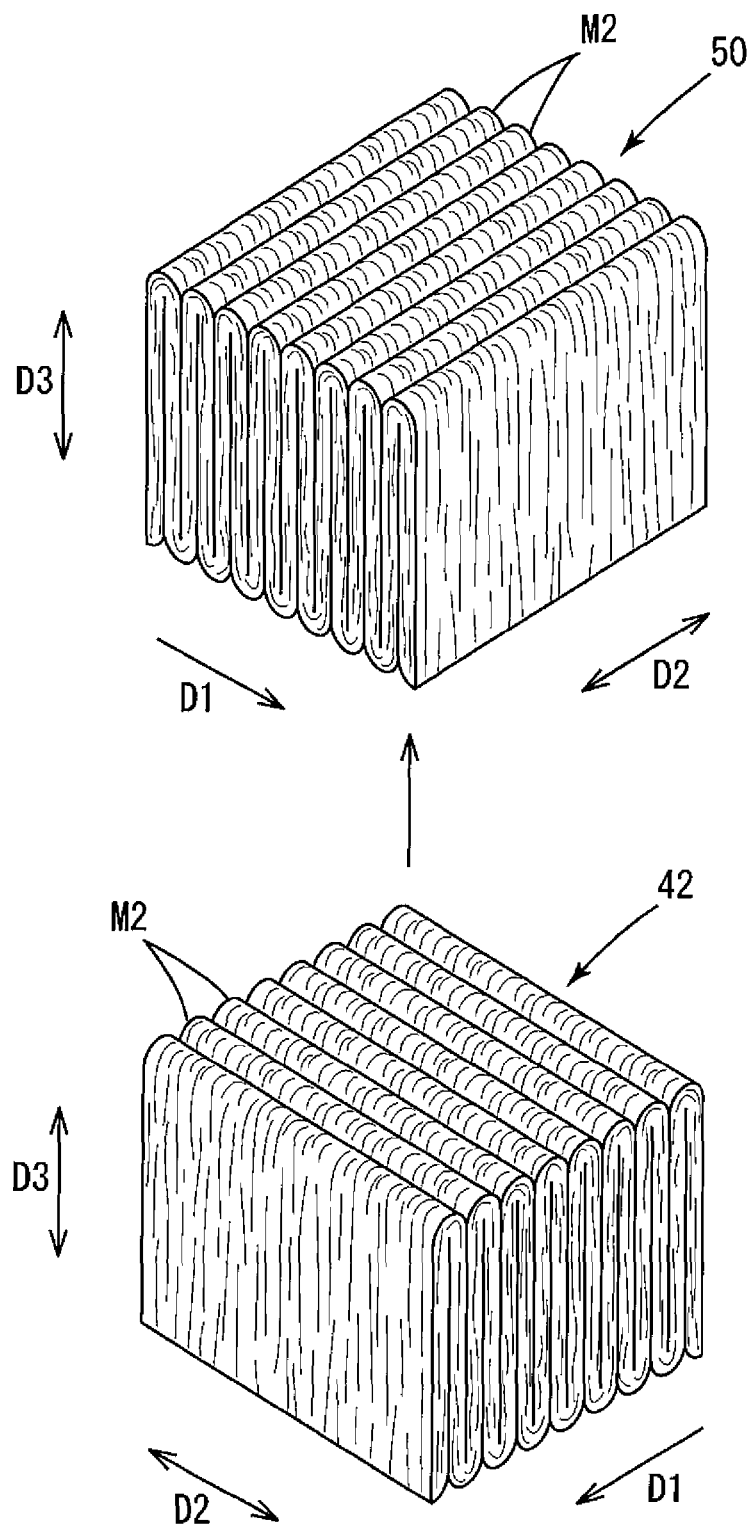
FIG. 16 is a perspective view for explaining an orientation example of a buffer material 42 on which the floor carpet 15 shown in FIG. 15 is placed.

When the buffer material 42 is post-applied to the buffer material layer 50, it is preferred that the post-application be performed in such a manner that folding directions of the constituent fibers (fibers 45, 46 shown in FIG. 4) are different from each other, for example, folding directions of the constituent fibers are orthogonal to each other as shown in FIG. 16. As a result, the repulsion force of the buffer material layer 50 and the buffer material 42 is increased and the molded laying interior material for a vehicle has good feel and improved resistance to loss of springiness, for example, the stepping comfort and resistance to loss of springiness of the floor carpet are improved.

(4) Sound Absorption Test of Buffer Material

The present invention will be described below in detail with reference to an example of a sound absorption test of a buffer material that can be used to form the present molded laying interior material for a vehicle, but the present invention is not limited to this example.

Preparation of Buffer Material Sample

PET fibers and cotton shoddy of clothing (lot 1) were used as the main fibers of Example 1. Only the cotton shoddy of clothing (lot 1) was used as the main fibers of Example 2. PET fibers and cotton shoddy of clothing (lot 2) were used as the main fibers of Example 3. Only the cotton shoddy of clothing (lot 2) was used as the main fibers of Example 4. Only PET fibers were used as the main fibers in a comparative example. PET/PET core-sheath fibers were used as adhesive fibers in Examples 1 to 4 and comparative example.

Fiber webs with the below-described compounding ratios (units: wt. %) were pleat-like folded with a textile lapping machine described in Japanese Translation of PCT Application No. 2008-538130 and buffer material samples with a weight of 600 g/m² and a thickness of 20 mm.

TABLE 1

|  | Example 1 | Example 2 | Example 3 | Example 4 | Comparative example |
|---|---|---|---|---|---|
| Main fibers | PET 20% Cotton shoddy 1: 50% | Cotton shoddy 1: 70% | PET 20% Cotton shoddy 2: 50% | Cotton shoddy 2: 70% | PET 70% |
| Adhesive fibers | 30% | 30% | 30% | 30% | 30% |

Method for Evaluating Sound Absorption Ability

Buffer material samples of Examples 1 to 4 and comparative example were used and a normal incidence sound absorption coefficient at a frequency of 200 to 6300 Hz was measured when noise was introduced in the thickness direction of the buffer materials. A sound absorption coefficient at ⅓ octave band central frequency (Hz) was measured as the normal incidence sound absorption coefficient according to a pipe interior method stipulated by JIS A1405: 2007-2 "Measurement of Sound Absorption Coefficient and Impedance with Acoustic Pipe—Part 2: Transfer Function Method".

Results

Figure 17:
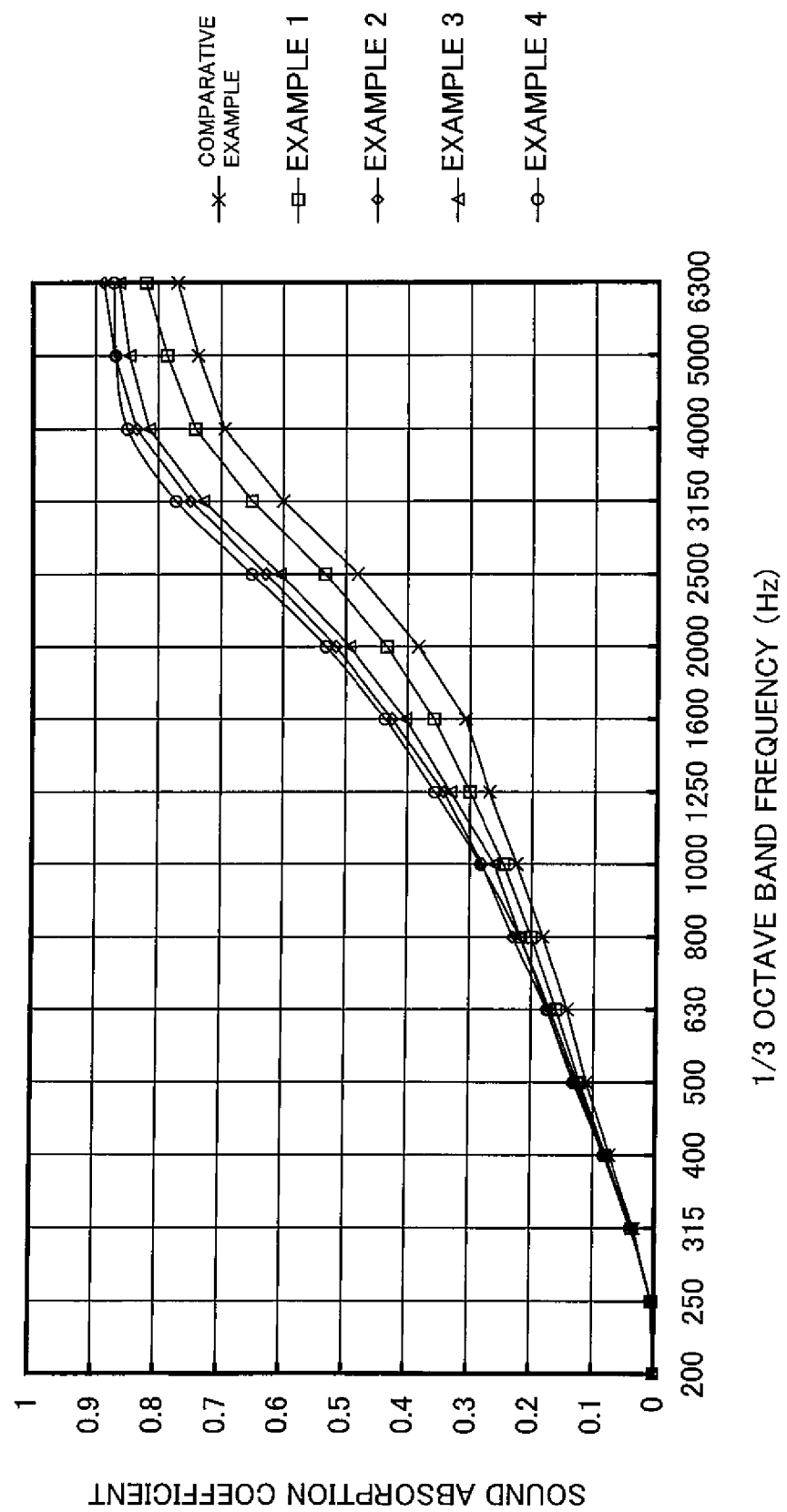
FIG. 17 is an exemplary illustration of the results obtained in measuring a normal incidence sound absorption coefficient of a buffer material versus a central frequency for each ⅓ octave band.
Figure 18:
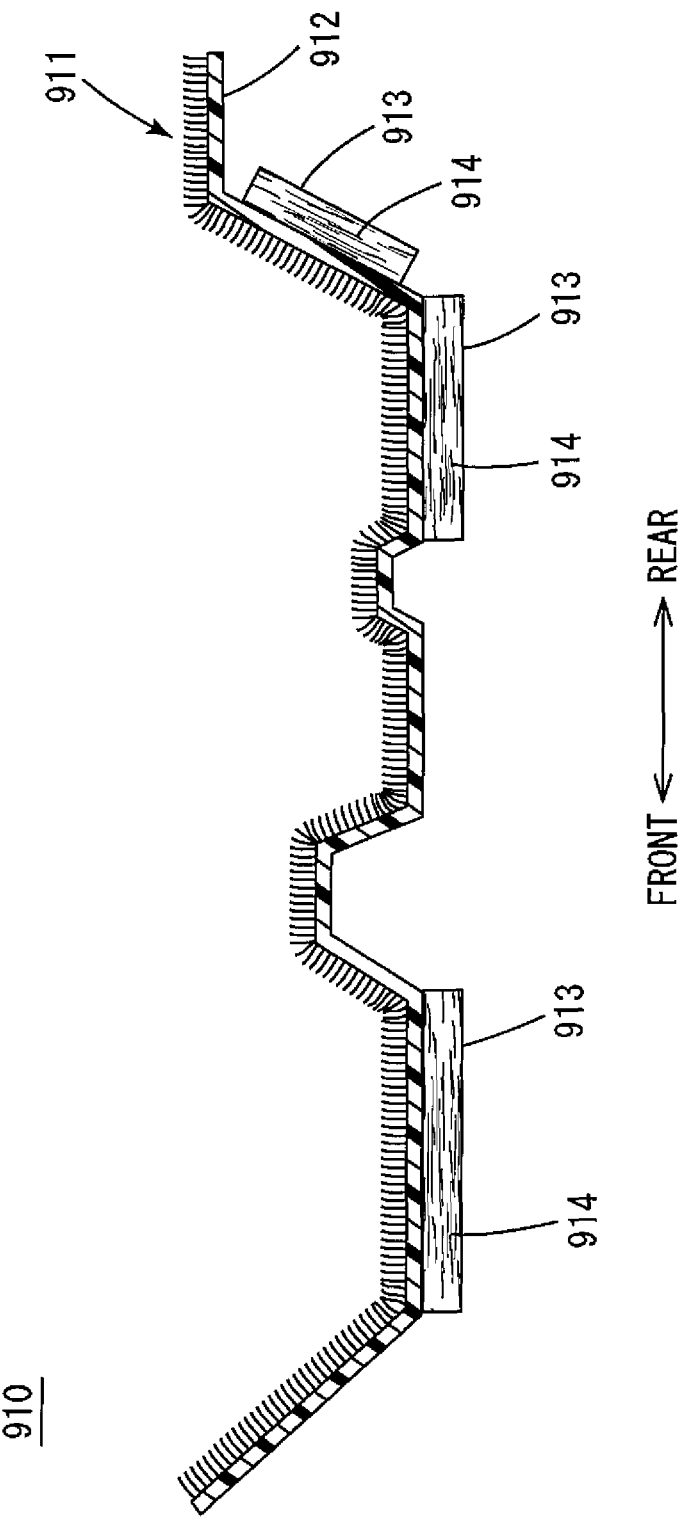
FIG. 18 is an exemplary illustration of an end surface obtained when a floor carpet 910 according to a comparative example is cut along a vertical plane extending in the front-rear direction of the automobile.
Figure 19:
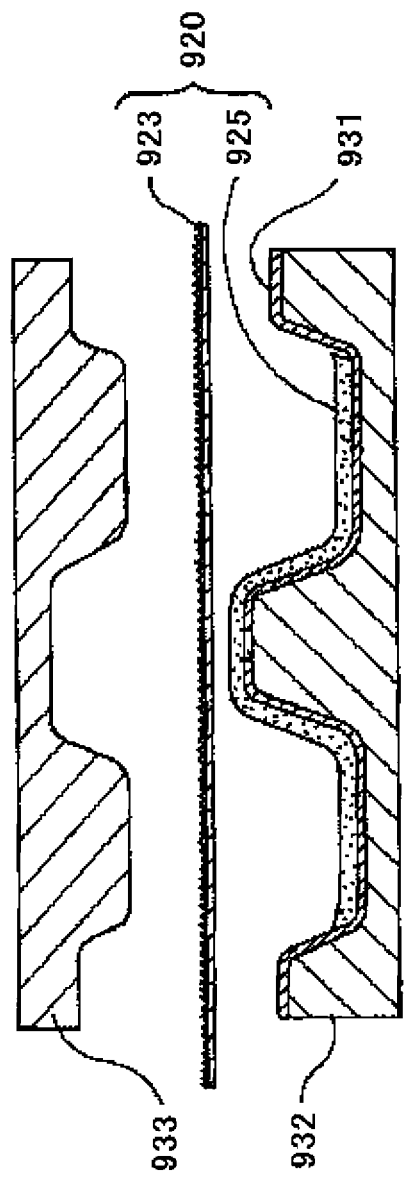
FIG. 19 is an exemplary illustration of a method for manufacturing a floor carpet 920 according to a comparative example.

The results obtained are shown in FIG. 17. The graph in FIG. 17 shows the results obtained by measuring a normal incidence sound absorption coefficient (units: none) at a central frequency (units: Hz) of each ⅓ octave band in a 200 to 6300 Hz range with respect to each example and comparative example.

The examples made it clear that the cotton shoddy of clothing introduced in the buffer material has improved the sound absorption performance. Therefore, the cotton shoddy introduced in the buffer material layer can be expected to improve the sound absorption performance of the molded laying interior material for a vehicle.

(5) Various Aspects

According to the above-described embodiment, the first aspect of the present invention resides in:

a molded laying interior material for a vehicle having a decorative layer facing a vehicle compartment and a buffer material layer facing a vehicle body panel, wherein an unmolded decorative material that forms the decorative layer and an unmolded buffer material that constitutes a fiber structure in which fibers are oriented in the thickness direction and forms the buffer material layer are simultaneously press molded in a state of being at least placed upon each other, and the decorative layer in which a concavo-convex shape on the vehicle compartment side is formed by the press molding, and the buffer material layer in which a concavo-convex shape on the side of the vehicle body panel is formed by the press molding, are at least laminated and integrated.

The second aspect of the present invention resides in:

a molded laying interior material for a vehicle having a decorative layer facing a vehicle compartment and a buffer material layer facing a vehicle body panel, wherein an unmolded decorative material that forms the decorative layer and an unmolded buffer material that has a wavelike shape in which webs are repeatedly folded back in the thickness direction and forms the buffer material layer are simultaneously press molded in a state of being at least placed upon each other, and the decorative layer in which a concavo-convex shape on the side of the vehicle compartment is formed by the press molding, and the buffer material layer in which a concavo-convex shape on the side of the vehicle body panel is formed by the press molding, are at least laminated and integrated.

The third aspect of the present invention resides in:

a molded laying interior material for a vehicle having a decorative layer facing a vehicle compartment and a buffer material layer facing a vehicle body panel, wherein an unmolded decorative material that forms the decorative layer and the buffer material layer in which a concavo-convex shape on the side of the vehicle body panel is formed by first press molding of a buffer material constituted by a fiber structure in which fibers are oriented in the thickness direction are subjected to second press molding in a state of being at least placed upon each other, and the decorative layer in which a concavo-convex shape on the side of the vehicle compartment is formed by the second press molding and the buffer material layer are at least laminated and integrated.

The fourth aspect of the present invention resides in:

a molded laying interior material for a vehicle having a decorative layer facing a vehicle compartment and a buffer material layer facing a vehicle body panel, wherein an unmolded decorative material that forms the decorative layer and the buffer material layer in which a concavo-convex shape on the side of the vehicle body panel is formed by first press molding of a buffer material that has a wavelike shape in which webs are repeatedly folded back in the thickness direction are subjected to second press molding in a state of being at least placed upon each other, and the decorative layer in which a concavo-convex shape on the side of the vehicle compartment is formed by the second press molding and the buffer material layer are at least laminated and integrated.

The fifth aspect of the present invention resides in:

a molded laying interior material for a vehicle having a decorative layer facing a vehicle compartment and a buffer material layer facing a vehicle body panel, wherein the decorative layer in which a concavo-convex shape on the side of the vehicle compartment is formed by first press molding of an unmolded decorative material that forms the decorative layer and an unmolded buffer material being a fiber structure in which fibers are oriented in the thickness direction are subjected to second press molding in a state of being at least placed upon each other, and the decorative layer and the buffer material layer in which a concavo-convex shape on the side of the vehicle body panel is formed by the second press molding are at least laminated and integrated.

The sixth aspect of the present invention resides in:

a molded laying interior material for a vehicle having a decorative layer facing a vehicle compartment and a buffer material layer facing a vehicle body panel, wherein the decorative layer in which a concavo-convex shape on a side of the vehicle compartment is formed by first press molding of an unmolded decorative material that forms the decorative layer, and an unmolded buffer material having a wavelike shape in which webs are repeatedly folded back in the thickness direction and forms the buffer material layer, are subjected to second press molding in a state of being at least placed upon each other, and the decorative layer and the buffer material layer in which a concavo-convex shape on the side of the vehicle body panel is formed by the second press molding are at least laminated and integrated.

According to the above-described first to sixth aspects, it is possible to provide a novel molded laying interior material for a vehicle in which a buffer material layer accommodated to a deep concavo-convex shape formed in the vehicle body panel is integrated by press molding.

Of course, an aspect of the present invention provides a molded laying interior material for a vehicle having a decorative layer facing a vehicle compartment and a buffer material layer facing a vehicle body panel, wherein the decorative layer in which a concavo-convex shape on a side of the vehicle compartment is formed by press molding, and the buffer material layer in which a concavo-convex shape on a side of the vehicle body panel is formed by press molding a buffer material being a fiber structure in which fibers are oriented in a thickness direction, are at least laminated and integrated.

Another aspect of the present invention provides a molded laying interior material for a vehicle having a decorative layer facing a vehicle compartment and a buffer material layer facing a vehicle body panel, wherein the decorative layer in which a concavo-convex shape on a side of the vehicle compartment is formed by press molding, and the buffer material layer in which a concavo-convex shape on a side of the vehicle body panel is formed by press molding a buffer material having a wavelike shape in which webs are repeatedly folded back in a thickness direction, are at least laminated and integrated.

An optional aspect of the present invention provides the molded laying interior material for a vehicle, wherein the main fibers include cotton shoddy fibers.

Even when no cotton shoddy fibers are contained in the buffer material, the obtained molded laying interior material for a vehicle is a novel interior material having integrated therein a buffer material layer accommodated to a deep concavo-convex shape formed in the vehicle body panel.

Even when fibers of only one kind constitute the buffer material, if the fibers are oriented in the thickness direction, the obtained molded laying interior material for a vehicle is a novel interior material having integrated therein a buffer material layer accommodated to a deep concavo-convex shape formed in the vehicle body panel.

Thus, the above-described basic operation and effect can be obtained even with the molded laying interior material for a vehicle having only the features set forth in the independent claims and having no features set forth in the dependent claims.

As described hereinabove, according to the present invention it is possible to provide a novel interior material having integrated therein a buffer material layer accommodated to a deep concavo-convex shape formed in the vehicle body panel in various embodiments thereof.

Further, according to another aspect, it is possible to provide a novel interior material having a buffer material layer with a concavo-convex shape maintained by a binder.

According to yet another aspect, it is possible to improve sound absorption ability.

According to yet another aspect, it is possible to increase the degree of freedom in designing the rear surface shape of a molded laying interior material for a vehicle.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. Therefore, the present invention is not limited to the above-described embodiments and variation examples and also includes features obtained by replacing the conventional features and the features disclosed in the above-described embodiments and variation examples with each other or changing the combinations thereof.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A molded laying interior material for a vehicle, comprising:
   a decorative layer that faces a vehicle compartment; and
   a buffer material layer that faces a vehicle body panel;
   the decorative layer has a first concavo-convex shape formed by press molding on a side of the vehicle compartment;
   the buffer material layer has a second concavo-convex shape formed by press molding a buffer material on a side of the vehicle body panel;
   the buffer material has a wavelike shape in which a web is repeatedly folded back in a thickness direction in the wavelike shape such that pleats are formed;
   the decorative layer and the buffer material layer are at least laminated and integrated;
   the second concavo-convex shape of the buffer material layer includes a first cross-sectional shape along a lamination direction of the pleats and a second cross-sectional shape along a width direction of the buffer material; and
   a height from a lowest part to a highest part in the first cross-sectional shape along the lamination direction of the pleats is larger than a height from a lowest part to a highest part in the second cross-sectional shape along the width direction of the buffer material when the decorative layer is disposed on a bottom of the vehicle compartment.

2. A molded laying interior material for a vehicle, comprising:
   a decorative layer that faces a vehicle compartment; and
   a buffer material layer that faces a vehicle body panel;
   the decorative layer has a first concavo-convex shape formed by press molding on a side of the vehicle compartment;
   the buffer material layer has a second concavo-convex shape formed by press molding a first buffer material on a side of the vehicle body panel;
   the first buffer material has a wavelike shape in which a web is repeatedly folded back in a thickness direction in the wavelike shape such that pleats are formed;
   the decorative layer and the buffer material layer are at least laminated and integrated;
   the second concavo-convex shape of the buffer material layer includes a first cross-sectional shape along a lamination direction of the pleats and a second cross-sectional shape along a width direction of the buffer material;
   a height from a lowest part to a highest part in the first cross-sectional shape along the lamination direction of the pleats is larger than a height from a lowest part to a highest tart in the second cross-sectional shape along the width direction of the buffer material when the decorative layer is disposed on a bottom of the vehicle compartment;
   a second buffer material is post-applied to a surface of the buffer material layer on the vehicle body panel side;
   the second buffer material has a fiber structure in which a web is repeatedly folded back in a thickness direction in the fiber structure; and
   a folding direction of constituent fibers in the second buffer material is different from a folding direction of constituent fibers in the buffer material layer.

3. The molded laying interior material for a vehicle according to claim 1, wherein the buffer material layer has a portion whose thickness is 65% or less of a maximum thickness of the buffer material layer.

4. The molded laying interior material for a vehicle according to claim 1, wherein
   the buffer material layer is laminated on part of a surface on the side of the vehicle body panel, and
   felt is post-applied, after the press molding, to the surface on the side of the vehicle body panel where the buffer material layer is not provided.

5. The molded laying interior material for a vehicle according to claim 1, further comprising:
   a perforated resin layer that is provided between the decorative layer and the buffer material layer; and
   a sound absorbing layer that is provided between the perforated resin layer and the buffer material layer;
   wherein
   a plurality of holes passing through in a thickness direction is formed in the perforated resin layer;
   the decorative layer has air permeability;
   the perforated resin layer has a third concavo-convex shape formed by press molding;
   the sound absorbing layer has a fourth concavo-convex shape formed by press molding;
   the decorative layer, the perforated resin layer, the sound absorbing layer and the buffer material layer are at least laminated and integrated;
   the third concavo-convex shape of the perforated resin layer is different from the second concavo-convex shape of the buffer material layer; and
   the fourth concavo-convex shape of the sound absorbing layer is different from the second concavo-convex shape of the buffer material layer.

6. The molded laying interior material for a vehicle according to claim 1, further comprising a perforated resin layer that is provided between the decorative layer and the buffer material layer;
   wherein
   a plurality of holes passing through in a thickness direction is formed in the perforated resin layer;
   the decorative layer has air permeability;
   the perforated resin layer has a third concavo-convex shape formed by press molding;
   the decorative layer, the perforated resin layer and the buffer material layer are at least laminated and integrated;
   the third concavo-convex shape of the perforated resin layer is different from the second concavo-convex shape of the buffer material layer; and
   the perforated resin layer is in contact with the buffer material layer.

* * * * *